(12) United States Patent
Nakamura

(10) Patent No.: US 8,907,967 B2
(45) Date of Patent: Dec. 9, 2014

(54) IMAGE PROCESSING APPARATUS, IMAGE PROCESSING METHOD AND PROGRAM

(75) Inventor: Sensaburo Nakamura, Shizuoka (JP)

(73) Assignee: Sony Corporation, Tokyo (JP)

(*) Notice: Subject to any disclaimer, the term of this patent is extended or adjusted under 35 U.S.C. 154(b) by 917 days.

(21) Appl. No.: 13/077,240

(22) Filed: Mar. 31, 2011

(65) Prior Publication Data

US 2011/0249023 A1 Oct. 13, 2011

(30) Foreign Application Priority Data

Apr. 7, 2010 (JP) ................. P2010-089028

(51) Int. Cl.

| G06T 1/00 | (2006.01) |
|---|---|
| G09G 5/00 | (2006.01) |
| G09G 5/02 | (2006.01) |
| G06K 9/54 | (2006.01) |
| G06K 9/03 | (2006.01) |
| G06F 3/048 | (2013.01) |
| H04N 5/262 | (2006.01) |
| G06T 19/00 | (2011.01) |

(52) U.S. Cl.
CPC ............. *H04N 5/262* (2013.01); *G06T 19/00* (2013.01)
USPC ........... 345/581; 345/418; 345/618; 345/619; 345/600; 345/574; 382/305; 382/311; 715/764

(58) Field of Classification Search
USPC ......... 345/418, 581, 589, 600–601, 618, 619, 345/501, 530, 536–538, 548, 574; 358/537–538, 448, 452–453; 382/254, 382/274, 276, 282, 305, 307, 309, 311; 711/100, 155; 715/200, 700, 764
See application file for complete search history.

(56) References Cited

U.S. PATENT DOCUMENTS

| 5,754,183 A * | 5/1998 | Berend et al. ................. 345/592 |
| 6,321,266 B1 * | 11/2001 | Yokomizo et al. ............ 709/226 |
| 6,587,113 B1 * | 7/2003 | Baldwin et al. ............... 345/557 |
| 6,911,982 B1 | 6/2005 | Signes |
| 2002/0012453 A1 * | 1/2002 | Hashimoto et al. ........... 382/112 |

FOREIGN PATENT DOCUMENTS

| JP | 2002 13874 | 1/2002 |
| JP | 2002 83316 | 3/2002 |
| JP | 2002 369076 | 12/2002 |
| JP | 2005 251161 | 9/2005 |
| JP | 2009 187586 | 8/2009 |

* cited by examiner

*Primary Examiner* — Wesner Sajous
(74) *Attorney, Agent, or Firm* — Frommer Lawrence & Haug LLP; William S. Frommer

(57) ABSTRACT

An image processing apparatus includes: a working storage section in which computer graphics description data of a storage format in which a computer graphics material can be edited are developed so as to be used for production of an image; an updating controlling section adapted to control a writing operation into part of the working storage section in accordance with derivative information representative of information which describes control for the stored contents of the working storage section; and an image production section adapted to produce a computer graphics image based on the stored contents of the working storage section.

12 Claims, 28 Drawing Sheets

FIG.13

```
1   <?xml version="1.0" encoding="utf-8" ?>
2   <COLLADA xmlns="http://www.collada.org/2005/11/COLLADASchema" version="1.4.0">
3     <asset>...</asset>
4     <library_images>
5       <image id="img6-image" name="img6">
6         <init_from>file://C:\Documents and Settings\user1\My Documents\My Videos\acg.mpg</init_from>
7       </image>
8       <image id="img5-image" name="img5">
9         <init_from>file://C:\Documents and Settings\user1\My Documents\My Videos\city.avi</init_from>
10      </image>
11    </library_images>
12    <library_materials>
13      <material id="id2_Material" name="id2_Material">
14        <instance_effect url="#id2_Material-fx" />
15      </material>
16      <material id="id1_Material" name="id1_Material">
17        <instance_effect url="#id1_Material-fx" />
18      </material>
19      <material id="id4_Material" name="id4_Material">
20        <instance_effect url="#id4_Material-fx" />
21      </material>
22      <material id="id7_Material" name="id7_Material">
23        <instance_effect url="#id7_Material-fx" />
24      </material>
25      <material id="id3_Material" name="id3_Material">
26        <instance_effect url="#id3_Material-fx" />
27      </material>
28    </library_materials>
29    <library_effects>
30      <effect id="id2_Material-fx" name="id2_Material">
31        <profile_COMMON>
32          <technique sid="standard">
33            <phong>
34              <emission>
35                <color sid="emission">0.000000 0.000000 0.000000 1.000000</color>
36              </emission>
37              <ambient>
38                <color sid="ambient">0.878431 0.588235 0.847059 1.000000</color>
39              </ambient>
40              <diffuse>
41                <texture texture="img6-image" texcoord="CHANNEL0" />
42              </diffuse>
43              <specular>
44                <color sid="specular">0.000000 0.000000 0.000000 1.000000</color>
45              </specular>
46              <shininess>
47                <float sid="shininess">2.000000</float>
48              </shininess>
49              <reflective>
50                <color sid="reflective">0.000000 0.000000 0.000000 1.000000</color>
51              </reflective>
52              <reflectivity>
```

FIG. 14

```
53        <float sid="reflectivity">1.000000</float>
54       </reflectivity>
55       <transparent>
56         <color sid="transparent">1.000000 1.000000 1.000000 1.000000</color>
57       </transparent>
58       <transparency>
59         <float sid="transparency">0.000000</float>
60       </transparency>
61      </phong>
62     </technique>
63    </profile_COMMON>
64   </effect>
65   <effect id="id1_Material-fx" name="id1_Material">...</effect>
66   <effect id="id4_Material-fx" name="id4_Material">...</effect>
67   <effect id="id7_Material-fx" name="id7_Material">...</effect>
68   <effect id="id3_Material-fx" name="id3_Material">...</effect>
69  </library_effects>
70  <library_geometries>
71   <geometry id="Box01-lib" name="Box01Mesh">
72    <mesh>
73     <source id="Box01-lib-Position">
74      <float_array id="Box01-lib-Position-array" count="24">-1.126406 -1.153628 0.000000
          1.126406 -1.153628 0.000000 -1.126406 1.153628 0.000000 1.126406 1.153628
          0.000000 -1.126406 -1.153628 1.713831 1.126406 -1.153628 1.713831 -1.126406
          1.153628 1.713831 1.126406 1.153628 1.713831</float_array>
75      <technique_common>
76       <accessor source="#Box01-lib-Position-array" count="8" stride="3">
77        <param name="X" type="float" />
78        <param name="Y" type="float" />
79        <param name="Z" type="float" />
80       </accessor>
81      </technique_common>
82     </source>
83     <source id="Box01-lib-Normal0">
84      <float_array id="Box01-lib-Normal0-array" count="108">0.000000 0.000000 -1.000000 ...
          -1.000000 0.000000 0.000000</float_array>
85      <technique_common>
86       <accessor source="#Box01-lib-Normal0-array" count="36" stride="3">
87        <param name="X" type="float" />
88        <param name="Y" type="float" />
89        <param name="Z" type="float" />
90       </accessor>
91      </technique_common>
92     </source>
93     <source id="Box01-lib-UV0">
94      <float_array id="Box01-lib-UV0-array" count="24">0.000000 0.000000 1.000000 0.000000 ...
          1.000000 1.000000</float_array>
95      <technique_common>
96       <accessor source="#Box01-lib-UV0-array" count="12" stride="2">
97        <param name="S" type="float" />
98        <param name="T" type="float" />
99       </accessor>
```

FIG.15

```
100      </technique_common>
101     </source>
102     <vertices id="Box01-lib-Vertex">
103       <input semantic="POSITION" source="#Box01-lib-Position" />
104     </vertices>
105     <polygons material="id2_Material" count="12">
106       <input semantic="VERTEX" offset="0" source="#Box01-lib-Vertex" />
107       <input semantic="NORMAL" offset="1" source="#Box01-lib-Normal0" />
108       <input semantic="TEXCOORD" offset="2" set="0" source="#Box01-lib-UV0" />
109       <p>0 0 9 2 1 11 3 2 10</p>
110       <p>3 3 10 1 4 8 0 5 9</p>
111       <p>4 6 8 5 7 9 7 8 11</p>
112       <p>7 9 11 6 10 10 4 11 8</p>
113       ...
114       <p>4 33 3 6 34 2 2 35 0</p>
115     </polygons>
116   </mesh>
117 </geometry>
118 <geometry id="Box02-lib" name="Box02Mesh">...</geometry>
119 <geometry id="Text01-lib" name="Text01Mesh">
120   <mesh>
121     <source id="Text01-lib-Position">
122       <float_array id="Text01-lib-Position-array" count="126">0.400641 29.663095 0.000000...
          2.057928 31.617443 4.500000 1.721780 31.085861 4.500000 1.323093 30.569914
          4.500000 0.861867 30.069597 4.500000</float_array>
123       <technique_common>
124         <accessor source="#Text01-lib-Position-array" count="42" stride="3">
125           <param name="X" type="float" />
126           <param name="Y" type="float" />
127           <param name="Z" type="float" />
128         </accessor>
129       </technique_common>
130     </source>
131     <source id="Text01-lib-Normal0">
132       <float_array id="Text01-lib-Normal0-array" count="720">-0.612125 0.790761 0.000000 ...
          0.000000 0.000000 1.000000</float_array>
133       <technique_common>
134         <accessor source="#Text01-lib-Normal0-array" count="240" stride="3">
135           <param name="X" type="float" />
136           <param name="Y" type="float" />
137           <param name="Z" type="float" />
138         </accessor>
139       </technique_common>
140     </source>
141     <vertices id="Text01-lib-Vertex">
142       <input semantic="POSITION" source="#Text01-lib-Position" />
143     </vertices>
144     <polygons material="id4_Material" count="80">
145       <input semantic="VERTEX" offset="0" source="#Text01-lib-Vertex" />
146       <input semantic="NORMAL" offset="1" source="#Text01-lib-Normal0" />
147       <p>0 0 1 1 22 2</p>
148       <p>0 3 22 4 21 5</p>
```

FIG. 16

```
149      <p>1 6 2 7 23 8</p>
150      ...
151      <p>28 237 29 238 27 239</p>
152     </polygons>
153    </mesh>
154   </geometry>
155   <geometry id="Text02-lib" name="Text02Mesh">...</geometry>
156   <geometry id="Text03-lib" name="Text03Mesh">...</geometry>
157   <geometry id="Text04-lib" name="Text04Mesh">...</geometry>
158   <geometry id="Text05-lib" name="Text05Mesh">...</geometry>
159   <geometry id="Sphere01-lib" name="Sphere01Mesh">
160    <mesh>
161     <source id="Sphere01-lib-Position">
162      <float_array id="Sphere01-lib-Position-array" count="1446">0.000000 0.000000 3.515733
           -0.000000 0.685886 3.448179 ... 0.000000 0.000000 -3.515733</float_array>
163      <technique_common>
164       <accessor source="#Sphere01-lib-Position-array" count="482" stride="3">
165        <param name="X" type="float" />
166        <param name="Y" type="float" />
167        <param name="Z" type="float" />
168       </accessor>
169      </technique_common>
170     </source>
171     <source id="Sphere01-lib-Normal0">
172      <float_array id="Sphere01-lib-Normal0-array" count="8640">0.000000 0.000000 1.000000 ...
           0.039207 0.197107 -0.979598</float_array>
173      <technique_common>
174       <accessor source="#Sphere01-lib-Normal0-array" count="2880" stride="3">
175        <param name="X" type="float" />
176        <param name="Y" type="float" />
177        <param name="Z" type="float" />
178       </accessor>
179      </technique_common>
180     </source>
181     <source id="Sphere01-lib-UV0">
182      <float_array id="Sphere01-lib-UV0-array" count="1122">0.000000 1.000000 ... 1.000000
           -0.000000</float_array>
183      <technique_common>
184       <accessor source="#Sphere01-lib-UV0-array" count="561" stride="2">
185        <param name="S" type="float" />
186        <param name="T" type="float" />
187       </accessor>
188      </technique_common>
189     </source>
190     <vertices id="Sphere01-lib-Vertex">
191      <input semantic="POSITION" source="#Sphere01-lib-Position" />
192     </vertices>
193     <polygons material="id7_Material" count="960">
194      <input semantic="VERTEX" offset="0" source="#Sphere01-lib-Vertex" />
195      <input semantic="NORMAL" offset="1" source="#Sphere01-lib-Normal0" />
196      <input semantic="TEXCOORD" offset="2" set="0" source="#Sphere01-lib-UV0" />
197      <p>0 0 0 1 1 33 2 2 34</p>
```

FIG.17

```
198      <p>0 3 1 2 4 34 3 5 35</p>
199      ...
200      <p>481 2877 559 449 2878 527 480 2879 526</p>
201     </polygons>
202    </mesh>
203   </geometry>
204   <geometry id="Cone01-lib" name="Cone01Mesh">...</geometry>
205  </library_geometries>
206  <library_animations>
207   <animation id="Spot01-anim" name="Spot01">
208    <animation>
209     <source id="Spot01-rotateX-animation-inputANGLE">
210      <float_array id="Spot01-rotateX-animation-inputANGLE-array" count="101">0.000000
          0.033333 0.066667 0.100000 0.133333 0.166667 ... 3.200000 3.233333 3.266667
          3.300000 3.333333</float_array>
211      <technique_common>
212       <accessor source="#Spot01-rotateX-animation-inputANGLE-array" count="101">
213        <param name="TIME" type="float" />
214       </accessor>
215      </technique_common>
216     </source>
217     <source id="Spot01-rotateX-animation-outputANGLE">
218      <float_array id="Spot01-rotateX-animation-outputANGLE-array" count="101">90.000000
          90.000000 90.000000 90.000000 90.000000 90.000000 90.000000 ...
          90.000000 90.000000 90.000000 90.000000 90.000000</float_array>
219      <technique_common>
220       <accessor source="#Spot01-rotateX-animation-outputANGLE-array" count="101">
221        <param name="ANGLE" type="float" />
222       </accessor>
223      </technique_common>
224     </source>
225     <source id="Spot01-rotateX-animation-intanANGLE">
226      <float_array id="Spot01-rotateX-animation-intanANGLE-array" count="101">0.000000
          0.000000 0.000000 0.000000 0.000000 0.000000 ... 0.000000 0.000000 0.000000
          0.000000 0.000000</float_array>
227      <technique_common>
228       <accessor source="#Spot01-rotateX-animation-intanANGLE-array" count="101">
229        <param name="ANGLE" type="float" />
230       </accessor>
231      </technique_common>
232     </source>
233     <source id="Spot01-rotateX-animation-outtanANGLE">
234      <float_array id="Spot01-rotateX-animation-outtanANGLE-array" count="101">
          0.000000 0.000000 0.000000 0.000000 ... 0.000000 0.000000 0.000000 0.000000
          0.000000</float_array>
235      <technique_common>
236       <accessor source="#Spot01-rotateX-animation-outtanANGLE-array" count="101">
237        <param name="ANGLE" type="float" />
238       </accessor>
239      </technique_common>
240     </source>
241     <source id="Spot01-rotateX-animation-interpolationANGLE">
```

FIG. 18

```
242    <Name_array id="Spot01-rotateX-animation-interpolationANGLE-array" count="101">
       BEZIER BEZIER BEZIER BEZIER BEZIER BEZIER BEZIER BEZIER BEZIER BEZIER
       BEZIER ... BEZIER BEZIER BEZIER BEZIER BEZIER BEZIER</Name_array>
243    <technique_common>
244      <accessor source="#Spot01-rotateX-animation-interpolationANGLE-array" count="101">
245        <param type="name" />
246      </accessor>
247    </technique_common>
248   </source>
249   <sampler id="Spot01-rotateX-animationANGLE">
250     <input semantic="INPUT" source="#Spot01-rotateX-animation-inputANGLE" />
251     <input semantic="OUTPUT" source="#Spot01-rotateX-animation-outputANGLE" />
252     <input semantic="IN_TANGENT" source="#Spot01-rotateX-animation-intanANGLE" />
253     <input semantic="OUT_TANGENT" source="#Spot01-rotateX-animation-outtanANGLE" />
254     <input semantic="INTERPOLATION" source="#Spot01-rotateX-animation-
           interpolationANGLE" />
255   </sampler>
256   <channel source="#Spot01-rotateX-animationANGLE" target="Spot01/rotateX.ANGLE" />
257  </animation>
258  <animation>
259   <source id="Spot01-rotateY-animation-inputANGLE">
260     <float_array id="Spot01-rotateY-animation-inputANGLE-array" count="101">0.000000
           0.033333 0.066667 0.100000 0.133333 0.166667 0.200000 0.233333 ... 3.200000
           3.233333 3.266667 3.300000 3.333333</float_array>
261     <technique_common>
262       <accessor source="#Spot01-rotateY-animation-inputANGLE-array" count="101">
263         <param name="TIME" type="float" />
264       </accessor>
265     </technique_common>
266   </source>
267   <source id="Spot01-rotateY-animation-outputANGLE">
268     <float_array id="Spot01-rotateY-animation-outputANGLE-array" count="101">-0.000000
           0.000000 0.000000 0.000000 0.000000 0.000000 0.000000 0.000000 ... 0.000000
           0.000000 0.000000 0.000000 0.000000</float_array>
269     <technique_common>
270       <accessor source="#Spot01-rotateY-animation-outputANGLE-array" count="101">
271         <param name="ANGLE" type="float" />
272       </accessor>
273     </technique_common>
274   </source>
275   <source id="Spot01-rotateY-animation-intanANGLE">
276     <float_array id="Spot01-rotateY-animation-intanANGLE-array" count="101">0.000000
           0.000000 0.000000 0.000000 0.000000 0.000000 0.000000 0.000000 0.000000 0.000000
           0.000000 0.000000 0.000000 0.000000 0.000000 0.000000 ... 0.000000 0.000000
           0.000000 0.000000 0.000000</float_array>
277     <technique_common>
278       <accessor source="#Spot01-rotateY-animation-intanANGLE-array" count="101">
279         <param name="ANGLE" type="float" />
280       </accessor>
281     </technique_common>
282   </source>
283   <source id="Spot01-rotateY-animation-outtanANGLE">
```

FIG. 19

```
284    <float_array id="Spot01-rotateY-animation-outtanANGLE-array" count="101">
         0.000000 0.000000 0.000000 0.000000 ... 0.000000 0.000000 0.000000 0.000000
         0.000000</float_array>
285    <technique_common>
286      <accessor source="#Spot01-rotateY-animation-outtanANGLE-array" count="101">
287        <param name="ANGLE" type="float" />
288      </accessor>
289    </technique_common>
290  </source>
291  <source id="Spot01-rotateY-animation-interpolationANGLE">
292    <Name_array id="Spot01-rotateY-animation-interpolationANGLE-array" count="101">
         BEZIER BEZIER BEZIER BEZIER BEZIER BEZIER BEZIER BEZIER BEZIER
         BEZIER ... BEZIER BEZIER BEZIER BEZIER BEZIER BEZIER</Name_array>
293    <technique_common>
294      <accessor source="#Spot01-rotateY-animation-interpolationANGLE-array" count="101">
295        <param type="name" />
296      </accessor>
297    </technique_common>
298  </source>
299  <sampler id="Spot01-rotateY-animationANGLE">
300    <input semantic="INPUT" source="#Spot01-rotateY-animation-inputANGLE" />
301    <input semantic="OUTPUT" source="#Spot01-rotateY-animation-outputANGLE" />
302    <input semantic="IN_TANGENT" source="#Spot01-rotateY-animation-intanANGLE" />
303    <input semantic="OUT_TANGENT" source="#Spot01-rotateY-animation-outtanANGLE" />
304    <input semantic="INTERPOLATION" source="#Spot01-rotateY-animation-
           interpolationANGLE" />
305  </sampler>
306  <channel source="#Spot01-rotateY-animationANGLE" target="Spot01/rotateY.ANGLE" />
307  </animation>
308  <animation>
309    <source id="Spot01-rotateZ-animation-inputANGLE">
310      <float_array id="Spot01-rotateZ-animation-inputANGLE-array" count="101">
         0.000000 0.033333 0.066667 0.100000 0.133333 0.166667 0.200000 0.233333 0.266667
         0.300000 0.333333 0.366667 0.400000 0.433333 0.466667 0.500000 ... 3.200000
         3.233333 3.266667 3.300000 3.333333</float_array>
311    <technique_common>
312      <accessor source="#Spot01-rotateZ-animation-inputANGLE-array" count="101">
313        <param name="TIME" type="float" />
314      </accessor>
315    </technique_common>
316  </source>
317  <source id="Spot01-rotateZ-animation-outputANGLE">
318    <float_array id="Spot01-rotateZ-animation-outputANGLE-array" count="101">
         15.587697 15.587697 15.587697 15.587697 15.587697 ... 15.587697 15.587697
         15.587697 15.587697 15.587697</float_array>
319    <technique_common>
320      <accessor source="#Spot01-rotateZ-animation-outputANGLE-array" count="101">
321        <param name="ANGLE" type="float" />
322      </accessor>
323    </technique_common>
324  </source>
325  <source id="Spot01-rotateZ-animation-intanANGLE">
```

FIG.20

```
326    <float_array id="Spot01-rotateZ-animation-intanANGLE-array" count="101">
         0.000000 0.000000 0.000000 0.000000 ... 0.000000 0.000000 0.000000 0.000000
         0.000000</float_array>
327    <technique_common>
328      <accessor source="#Spot01-rotateZ-animation-intanANGLE-array" count="101">
329        <param name="ANGLE" type="float" />
330      </accessor>
331    </technique_common>
332    </source>
333    <source id="Spot01-rotateZ-animation-outtanANGLE">
334      <float_array id="Spot01-rotateZ-animation-outtanANGLE-array" count="101">
         0.000000 0.000000 0.000000 0.000000 0.000000 0.000000 0.000000 0.000000 ...
         0.000000 0.000000 0.000000 0.000000 0.000000</float_array>
335      <technique_common>
336        <accessor source="#Spot01-rotateZ-animation-outtanANGLE-array" count="101">
337          <param name="ANGLE" type="float" />
338        </accessor>
339      </technique_common>
340    </source>
341    <source id="Spot01-rotateZ-animation-interpolationANGLE">
342      <Name_array id="Spot01-rotateZ-animation-interpolationANGLE-array" count="101">
         BEZIER BEZIER BEZIER BEZIER BEZIER BEZIER BEZIER BEZIER BEZIER BEZIER
         BEZIER ... BEZIER BEZIER BEZIER BEZIER BEZIER BEZIER</Name_array>
343      <technique_common>
344        <accessor source="#Spot01-rotateZ-animation-interpolationANGLE-array" count="101">
345          <param type="name" />
346        </accessor>
347      </technique_common>
348    </source>
349    <sampler id="Spot01-rotateZ-animationANGLE">
350      <input semantic="INPUT" source="#Spot01-rotateZ-animation-inputANGLE" />
351      <input semantic="OUTPUT" source="#Spot01-rotateZ-animation-outputANGLE" />
352      <input semantic="IN_TANGENT" source="#Spot01-rotateZ-animation-intanANGLE" />
353      <input semantic="OUT_TANGENT" source="#Spot01-rotateZ-animation-outtanANGLE" />
354      <input semantic="INTERPOLATION" source="#Spot01-rotateZ-animation-
           interpolationANGLE" />
355    </sampler>
356    <channel source="#Spot01-rotateZ-animationANGLE" target="Spot01/rotateZ.ANGLE" />
357   </animation>
358  </animation>
359  <animation id="Camera01-anim" name="Camera01">...</animation>
360  ...
361 </library_animations>
362 <library_lights>
363  <light id="Spot01-lib" name="Spot01Mesh">
364    <technique_common>
365      <spot>
366        <color sid="color">1.000000 1.000000 1.000000</color>
367        <falloff_angle sid="angle">45.000000</falloff_angle>
368      </spot>
369    </technique_common>
370  </light>
```

FIG. 21

```
371  </library_lights>
372  <library_cameras>
373    <camera id="Camera01-lib" name="Camera01Mesh">
374      <optics>
375        <technique_common>
376          <perspective>
377            <xfov sid="xfov">45.000001</xfov>
378            <aspect_ratio>1.333333</aspect_ratio>
379            <znear sid="znear">10.000000</znear>
380            <zfar sid="zfar">4000.000000</zfar>
381          </perspective>
382        </technique_common>
383      </optics>
384    </camera>
385  </library_cameras>
386  <library_visual_scenes>
387    <visual_scene id="RootNode" name="RootNode">
388      <node id="Box01" name="Box01">
389        <translate sid="translate">-34.706497 8.764190 -0.076581</translate>
390        <instance_geometry url="#Box01-lib">
391          <bind_material>
392            <technique_common>
393              <instance_material symbol="id2_Material" target="#id2_Material" />
394            </technique_common>
395          </bind_material>
396        </instance_geometry>
397      </node>
398      <node id="Box02" name="Box02">...</node>
399      <node id="Text01" name="Text01">
400        <translate sid="translate">-2.673170 0.706589 0.000001</translate>
401        <rotate sid="rotateZ">0 0 1 -4.138139</rotate>
402        <rotate sid="rotateY">0 1 0 -0.439810</rotate>
403        <rotate sid="rotateX">1 0 0 89.698368</rotate>
404        <instance_geometry url="#Text01-lib">
405          <bind_material>
406            <technique_common>
407              <instance_material symbol="id4_Material" target="#id4_Material" />
408            </technique_common>
409          </bind_material>
410        </instance_geometry>
411      </node>
412      <node id="Text02" name="Text02">...</node>
413      <node id="Text03" name="Text03">...</node>
414      <node id="Text04" name="Text04">...</node>
415      <node id="Text05" name="Text05">...</node>
416      <node id="Spot01" name="Spot01">
417        <translate sid="translate">29.240202 -93.445198 -0.000002</translate>
418        <rotate sid="rotateZ">0 0 1 15.587697</rotate>
419        <rotate sid="rotateY">0 1 0 0.000000</rotate>
420        <rotate sid="rotateX">1 0 0 90.000001</rotate>
421        <instance_light url="#Spot01-lib" />
422      </node>
```

FIG. 22

```
423  <node id="Spot01_Target" name="Spot01_Target">
424    <translate sid="translate">-14.166700 62.149849 0.000002</translate>
425  </node>
426  <node id="Camera01" name="Camera01">
427    <translate sid="translate">-6.886677 -79.651161 0.000000</translate>
428    <rotate sid="rotateZ">0 0 1 0.000000</rotate>
429    <rotate sid="rotateY">0 1 0 -0.000000</rotate>
430    <rotate sid="rotateX">1 0 0 90.000003</rotate>
431    <instance_camera url="#Camera01-lib" />
432  </node>
433  <node id="Sphere01" name="Sphere01">
434    <translate sid="translate">-36.684128 -0.527710 0.000000</translate>
435    <rotate sid="rotateZ">0 0 1 0.000000</rotate>
436    <rotate sid="rotateY">0 1 0 0.000000</rotate>
437    <rotate sid="rotateX">1 0 0 0.000000</rotate>
438   <scale sid="scale">1.000000 1.000000 1.000000</scale>
439   <instance_geometry url="#Sphere01-lib">
440      <bind_material>
441        <technique_common>
442          <instance_material symbol="id7_Material" target="#id7_Material" />
443        </technique_common>
444      </bind_material>
445    </instance_geometry>
446   </node>
447   <node id="Cone01" name="Cone01">...</node>
448  </visual_scene>
449 </library_visual_scenes>
450 <scene>
451   <instance_visual_scene url="#RootNode" />
452 </scene>
453 </COLLADA>
```

FIG.23

```xml
1   <?xml version="1.0" ?>
2   <!-- This is a comment -- >
3   <!-- Confidential -- >
4   <CG_Flavor>
5     <asset>
6       <!-- 1 -- >
7       <cg_root>/usr/local/cg_data</cg_root>
8       <!-- 1 -- >
9       <base>patsample1.dae</base>
10      <!-- 1 -- >
11      <!-- or both-format-file : <base>cube1.dae cube1.pssg</base> -- >
12      <contributor>
13        <!-- more equal than 0 -- >
14        <author>username</author>
15        <authoring_tool>NameOfAuthoringToolWithVersion</authoring_tool>
16        <comments>user comment</comments>
17        <copyright />
18        <source_data />
19        <!-- not for collada -- >
20      </contributor>
21      <created>2010-02-04T00:54:35Z</created>
22      <modified>2010-02-04T00:54:35Z</modified>
23      <revision />
24      <title>1_Operation_Config</title>
25      <subject />
26      <keywords />
27    </asset>
28    <baseinfo date="2010-02-04T00:54:35Z">
29      <base_material>id1_Material</base_material>
30      <base_material>id2_Material</base_material>
31      <base_material>id3_Material</base_material>
32      <base_material>id4_Material</base_material>
33      <base_material>id7_Material</base_material>
34    </baseinfo>
35    <modifier_assignment>
36      <modifier id="modifier_01" name="nob01">
37        <rel element="material" rel_id="id2_Material">
38          <!-- dest. top level -- >
39          <rel element="phong">
40            <rel element="emission">
41              <rel element="color">
42                <param_index>0</param_index>
43              </rel>
44            </rel>
45            <rel element="ambient">
46              <!-- multi destination -- >
47              <rel element="color">
48                <param_index>0</param_index>
49              </rel>
50            </rel>
51          </rel>
52        </rel>
```

FIG.24

```
53      <param_scale>1.0</param_scale>
54      <!-- option -- >
55      <param_offset>0</param_offset>
56      <!-- option -- >
57      <param_curve>linear</param_curve>
58      <range>0 1.0</range>
59      <!-- min,max -- >
60    <volume_knob_type>B</volume_knob_type>
61    <!-- B:linear,A:y=exp(x),C:y=log(x) -- >
62    <!-- future extension? : A 2.0: y=exp(2.0*x) -- >
63   </modifier>
64   <modifier id="modifier_02" name="nob02">
65     <rel element="node" rel_id="Camera01" instance="camera">
66       <!-- instance is optional -- >
67       <rel element="translate">
68         <param_index>1</param_index>
69         <!-- y -- >
70       </rel>
71     </rel>
72     <param_scale>1.0</param_scale>
73     <!-- option -- >
74     <param_offset>0</param_offset>
75     <!-- option -- >
76     <param_relative>true</param_relative>
77     <!-- option (for anim?) -- >
78   </modifier>
79   <modifier id="modifier_03" name="nob03" type="choice">
80     <choice>
81       <item node_id="">0</item>
82       <!-- none -- >
83       <item node_id="Text01">1</item>
84       <item node_id="Text02">2</item>
85       <item node_id="Text03">3</item>
86       <item node_id="Text04">4</item>
87       <item node_id="Text05">5</item>
88     </choice>
89   </modifier>
90   <modifier id="modifier_05" name="nob05" type="ctrl">
91     <!-- type ctrl is optional, this is for mapping -- >
92     <value_enum>1 2 3 4</value_enum>
93     <!-- or (min,max)? -- >
94     <value_default>4</value_default>
95   </modifier>
96   <modifier id="modifier_06" name="nob06" type="bind_material">
97     <!-- material selection -- >
98     <rel element="node" rel_id="Box01">
99       <rel element="instance_geometry">
100        <!-- needed? -- >
101        <rel rel_target="#id2_Material">
102          <material_item symbol="id2_Material">0</material_item>
103          <material_item symbol="id1_Material">1</material_item>
104        </rel>
```

FIG. 25

```
105      </rel>
106     </rel>
107    </modifier>
108    <modifier id="modifier_07" name="nob0" type="texture">
109     <!-- texture selection -- >
110     <rel element="effect" rel_id="id2_Material-fx">
111       <rel element="instance_geometry">
112        <!-- needed? -- >
113        <rel element="phong">
114          <rel element="diffuse">
115            <texture_item id="img6-image">0</texture_item>
116            <texture_item id="img5-image">1</texture_item>
117          </rel>
118        </rel>
119       </rel>
120     </rel>
121    </modifier>
122    <modifier id="modifier_08" name="nob08" type="hue">
123     <rel element="material" rel_id="id7_Material">
124       <!-- dest. top level -- >
125       <rel element="phong">
126        <rel element="emission">
127          <rel element="color">
128            <color_ctrl>hue</color_ctrl>
129            <!-- hue,lum,sat -- >
130          </rel>
131        </rel>
132       </rel>
133     </rel>
134     <param_scale>1.0</param_scale>
135     <!-- option -- >
136     <param_offset>0</param_offset>
137     <!-- option -- >
138     <param_curve>linear</param_curve>
139     <range>0 1.0</range>
140     <!-- min,max -- >
141     <volume_knob_type>B</volume_knob_type>
142    </modifier>
143    <data_link id="link1" name="ext_dlink1" dest="modifier_01">
144     <link_url id="lurl1">http://www.w3.org/TR/xmlschema/file1.html</link_url>
145     <link_accessor>
146       <bindata>
147        <!-- element choice from bin,xml,tokens,csv... -- >
148        <byte_offset>28</byte_offset>
149        <len>4</len>
150        <datatype>bin_integer</datatype>
151       </bindata>
152     </link_accessor>
153     <param_scale>1.0</param_scale>
154     <!-- option -- >
155     <param_offset>0</param_offset>
156     <!-- option -- >
```

FIG. 26

```
157    <link_interval>15</link_interval>
158    <!-- option, seconds -->
159   </data_link>
160   <data_link id="link2" name="ext_dlink2" dest="modifier_08">
161    <link_url id="lurl2">ftp://www.hoge.com/ftp/file2.html</link_url>
162    <link_accessor>
163     <xmldata>
164      <!-- element choice from bin,xml,tokens,csv... -->
165      <link_rel element="simpleOrder">
166       <link_rel element="food" att="taste" att_value="matcha">
167        <link_rel element="weight1">
168         <param_index>0</param_index>
169        </link_rel>
170       </link_rel>
171      </link_rel>
172      <datatype>float</datatype>
173     </xmldata>
174    </link_accessor>
175    <!-- ...omit... -->
176    <param_relative>true</param_relative>
177    <!-- ...omit... -->
178   </data_link>
179   <data_link id="link3" name="ext_dlink3" dest="modifier_02">
180    <!-- ...omit... -->
181    <link_accessor>
182     <csvdata>
183      <!-- element choice from bin,xml,tokens,csv... -->
184      <csv_row>3</csv_row>
185      <csv_column>4</csv_column>
186      <datatype>float</datatype>
187     </csvdata>
188    </link_accessor>
189    <!-- ...omit... -->
190   </data_link>
191   <data_link id="link4" name="ext_dlink4" dest="modifier_03">
192    <!-- ...omit... -->
193    <link_accessor>
194     <tokensdata>
195      <!-- element choice from bin,xml,tokens,csv... -->
196      <tokens_index>9</tokens_index>
197      <datatype>int</datatype>
198     </tokensdata>
199    </link_accessor>
200    <!-- ...omit... -->
201   </data_link>
202  </modifier_assignment>
203  <manipulator_assignment>
204   <manipulator id="manipulator_01" name="xyz01">
205    <rel element="node" rel_id="Camera01" instance="camera">
206     <!-- instance is optional -->
207     <rel element="translate">
208      <array_style>xyz</array_style>
```

FIG.27

```
209       </rel>
210      </rel>
211      <range />
212      <!-- min,max for each -->
213      <param_scale>1.0 1.0 1.0</param_scale>
214      <!-- option -->
215      <param_offset>0 0 0</param_offset>
216      <!-- option -->
217     </manipulator>
218    </manipulator_assignment>
219    <video_mapping>
220     <mapping id="vmap01" target="id1_Material" vin="1">
221      <!-- target is a material -->
222      <map_condition />
223      <mapping_ctrl>
224       <uv>
225        <affine_matrix>1 0 0 1 0.25 -0.25</affine_matrix>
226        <nonlinear />
227        <!-- future extension -->
228       </uv>
229       <uvw>
230        <affine_matrix />
231        <nonlinear />
232       </uvw>
233       <folding>true</folding>
234       <crop_transparent>5 5</crop_transparent>
235      <!-- x y [%] -->
236      </mapping_ctrl>
237     </mapping>
238     <!-- note: each material appears only once -->
239     <mapping id="vmap02" vin="2">
240      <!-- no target specified, only by condition -->
241      <condition id="cnd1">
242       <rel element="phong">
243        <rel element="ambient">
244         <rel element="color">
245          <param_index>0</param_index>
246         </rel>
247        </rel>
248       </rel>
249       <range_min>0</range_min>
250       <range_max>0.776</range_max>
251      </condition>
252      <condition id="cnd2">
253       <!-- ...omit... -->
254      </condition>
255      <condition id="cnd3">
256       <logic arg1="#cnd1" arg2="#cnd2" ope="and" />
257      </condition>
258      <!-- how to achive complex condition -->
259      <map_condition condition="#cnd3" />
260      <!-- omit ctrl description -->
```

FIG.28

```
261     </mapping>
262     <mapping id="vmap03" target="id2_Material" vin="#modifier_05">
263       <!-- vin is controlled with modifier_05 -- >
264       <!-- omit detail -- >
265     </mapping>
266   </video_mapping>
267   <timeline_ctrl>
268     <interval>0 1.0</interval>
269     <!-- start and end -- >
270   </timeline_ctrl>
271   <preview_ctrl>
272     <preview_type>pause</preview_type>
273     <!-- look_ahead/pause/play -- >
274     <preview_pause_time unit="sec">1.0</preview_pause_time>
275     <preview_speed>1.5</preview_speed>
276     <!-- option for type "play" -- >
277   </preview_ctrl>
278 </CG_Flavor>
```

IMAGE PROCESSING APPARATUS, IMAGE PROCESSING METHOD AND PROGRAM

BACKGROUND OF THE INVENTION

1. Field of the Invention

This invention relates to an image processing apparatus, an image processing method and a program, and more particularly to an image processing apparatus, an image processing method and a program which can be suitably applied where image synthesis, for example, by three-dimensional computer graphics is handled.

2. Description of the Related Art

A synthesis technique for synthesizing, for example, CG (Computer Graphics) images is known and disclosed, for example, in Japanese Patent Laid-Open Nos. 2002-369076, 2002-13874, 2002-83316, 2005-251161 and 2009-187586.

According to the synthesis technique, CG images of, for example, an MPEG (Moving Picture Experts Group) format obtained, for example, by rendering a plurality of CG materials produced by a CG producer are retained into a server in advance. Then, that one of the plural CG images retained in the server which is selected by a selection operation of a user is synthesized with a synthesis object image determined as an object of the synthesis such as, for example, an image obtained by imaging an announcer by means of a camera in a studio.

SUMMARY OF THE INVENTION

However, with the related art technique described above, when it is intended to use a CG image retained in advance in the server after the CG image is partly changed, the CG image cannot be used directly for synthesis. In particular, in order to allow the partly changed CG image to be used for synthesis, it is necessary to cause the CG producer to partly change a CG material which configures the CG image and then retain a new CG image obtained by rendering the partly changed CG material into the server.

Therefore, if it is intended to use a large number of CG images obtained by changing a CG image little by little so that they are a little different from each other, then it is necessary to produce CG images a little different from each other by rendering and retain the CG images into the server. Therefore, much labor is required.

Further, in this instance, since it is necessary to retain all CG images which are a little different from each other, the storage capacity of the server is used by a great amount.

Furthermore, if it is intended to use a large number of CG images obtained by changing a CG image little by little so that they are a little different from each other, then since it is not easy to manage a large number of CG materials, the CG materials to be used are substantially restricted.

Therefore, it is desirable to provide an image processing apparatus, an image processing method and a program by which, when a CG material is used, the contents of the CG material can be changed readily in response to an operation of a user. Also it is desirable to provide an image processing apparatus, an image processing method and a program by which it becomes easy to manage partial change of a CG material to be used.

According to an embodiment of the present invention, there is provided an image processing apparatus including working storage means in which computer graphics description data of a storage format in which a computer graphics material can be edited are developed so as to be used for production of an image, updating controlling means for controlling a writing operation into part of the working storage means in accordance with derivative information representative of information which describes control for the stored contents of the working storage means, and image production means for producing a computer graphics image based on the stored contents of the working storage means.

The image processing apparatus may be configured such that the derivative information includes parameter designation information which designates one or more of a plurality of parameters included in the computer graphics data as an adjustment object parameter, and the updating controlling means controls the writing operation into the part of the working storage means so that the adjustment object parameter included in the computer graphics description data developed in the working storage means may have a value corresponding to an adjustment operation of a user.

In this instance, the image processing apparatus may be configured such that the derivative information includes parameter value indication information which indicates that one of the plural parameters included in the computer graphics data is to be adjusted to a predetermined value, and the updating controlling means controls the writing operation into the part of the working storage means in accordance with the parameter value indication information so that the corresponding parameter may have the predetermined value. In this instance, the image processing apparatus may further include a plurality of parameter operation means for being operated by the user, the parameter designation information designating also that one of the plural parameter operation means which is provided to adjust the adjustment object parameter, the updating controlling means controlling the writing operation into the part of the working storage means so that, when the adjustment operation of the user is carried out for the parameter operation means designated by the parameter designation information, the adjustment object parameter may have a value according to the adjustment operation of the user.

Or, the updating controlling means may control the writing operation into the part of the working storage means so that the adjustment object parameter may have a value indicated by the indication operation of the user from among a plurality of retained values adjusted formerly by adjustment operation of the user.

Or else, the updating controlling means may control the writing operation into the part of the working storage means so that the adjustment object parameter may be the adjustment object parameter included in the computer graphics description data prior to the adjustment in response to an initialization operation of the user.

The image processing apparatus may further include derivative information retaining means for retaining the derivative information, and updating means for updating the parameter value indication information included in the derivative information in response to an updating operation of the user, the derivative information retaining means retaining the derivative information including the parameter value indication information after updated.

In this instance, the image processing apparatus may further include computer graphics data retaining means for retaining one or a plurality of computer graphics description data in advance therein, readout means for reading out the computer graphics description data corresponding to the derivative information read out from the derivative information retaining means from among the one or plural computer graphics description data, and setting means for setting, from among the plural parameters included in the computer graphics description data read out from the computer graphics description data retaining means, the parameter designated by the parameter designation information included in the derivative information read out from the derivative information retaining means as the adjustment object parameter.

In this instance, the image processing apparatus may be configured such that the derivative information includes identification information for identifying the corresponding computer graphics description data, and the readout means reads out the computer graphics description data identified with the identification information included in the derivative information read out from the derivative information retaining means.

Or, the image processing apparatus may further include link information retaining means for retaining link information which associates the derivative information and the corresponding computer graphics description data with each other in advance therein, the readout means for reading out the computer graphics description data corresponding to the derivative information read out from the derivative information retaining means based on the link information.

Or else, the image processing apparatus may be configured such that the readout means reads out the computer graphics description data selected by a selection operation of the user as the computer graphics description data corresponding to the derivative information read out from the derivative information retaining means.

According to another embodiment of the present invention, there is provided an image processing method for an image processing apparatus for producing a computer graphics image, the image processing apparatus including working storage means, updating controlling means and image production means, the image processing method including a step executed by the updating controlling means of controlling a writing operation into part of the working storage means in accordance with derivative information representative of information which describes control for the stored contents of the working storage means in which computer graphics description data of a storage format in which a computer graphics material can be edited are developed so as to be used for production of an image, and a step executed by the image production means of producing a computer graphics image based on the stored contents of the working storage means.

According to a further embodiment of the present invention, there is provided a program for causing a computer to function as updating controlling means of controlling a writing operation into part of working storage means in accordance with derivative information representative of information which describes control for the stored contents of the working storage means in which computer graphics description data of a storage format in which a computer graphics material can be edited are developed so as to be used for production of an image, and image production means for producing a computer graphics image based on the stored contents of the working storage means.

In the image processing apparatus, image processing method and program, a writing operation into the part of the working storage means is controlled in accordance with derivative information representative of information which describes control for the stored contents of the working storage means in which computer graphics description data of a storage format in which a computer graphics material can be edited are developed so as to be used for production of an image. Then, a computer graphics image is produced based on the stored contents of the working storage means.

With the image processing apparatus, image processing method and program, when a CG material is used, the contents of the CG material can be changed readily in response to an operation of the user. Further, with the image processing apparatus, image processing method and program, it becomes easier to manage partial change of a CG material to be used.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 13 to 22 are views illustrating an example of CG description data;

FIGS. 23 to 28 are views illustrating an example of derivative information; and

DETAILED DESCRIPTION OF THE PREFERRED EMBODIMENTS

In the following, preferred embodiments of the present invention are described with reference to the accompanying drawings. It is to be noted that the description is given in the following order.
1. First Embodiment (example wherein a parameter is adjusted)
2. Second Embodiment (example wherein a parameter is adjusted together with texture mapping)
3. Modifications <1. First Embodiment>
Example of the Configuration of the CG Synthesis System 1
FIG. 1 shows an example of a configuration of a CG synthesis system 1 to which the present invention is applied.

Figure 1:
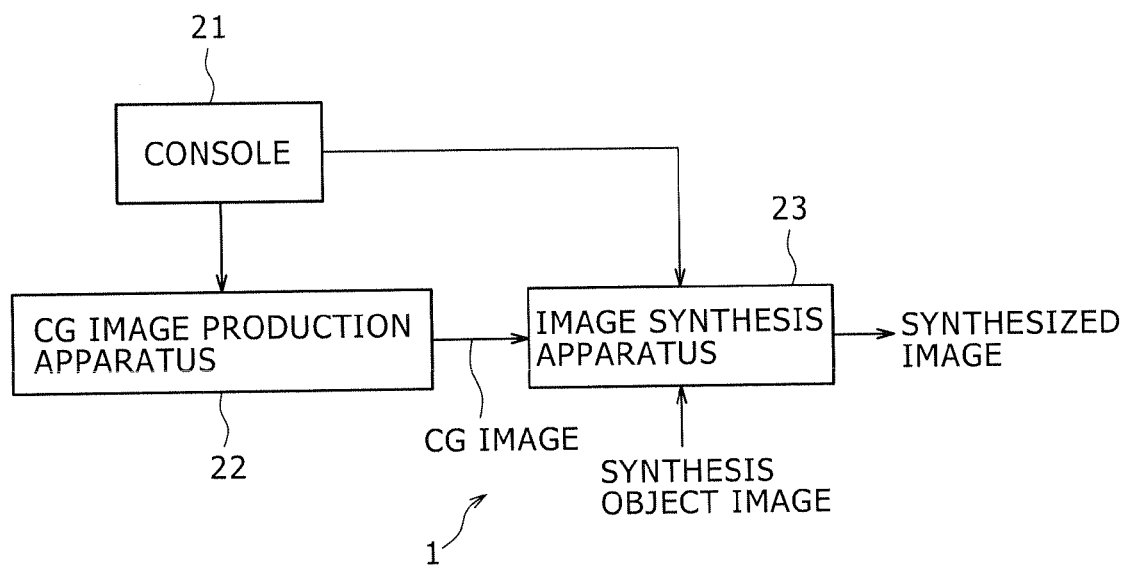
FIG. 1 is a block diagram showing an example of a configuration of a CG synthesis system according to a first embodiment of the present invention.

Referring to FIG. 1, the CG synthesis system 1 shown includes a console 21, a CG image production apparatus 22, and an image synthesis apparatus 23.

The console 21 includes adjustment knobs, a joystick and so forth used to work a CG image and is operated by a user. When the console 21 is operated by the user, it produces an operation signal corresponding to the operation of the user and supplies the operation signal to the CG image production apparatus 22.

Further, when the console 21 is operated by the user, it produces an operation signal corresponding to the operation of the user and supplies the operation signal to the image synthesis apparatus 23. It is to be noted that details of the console 21 are hereinafter described with reference to FIGS. 2 and 3.

Figure 4:
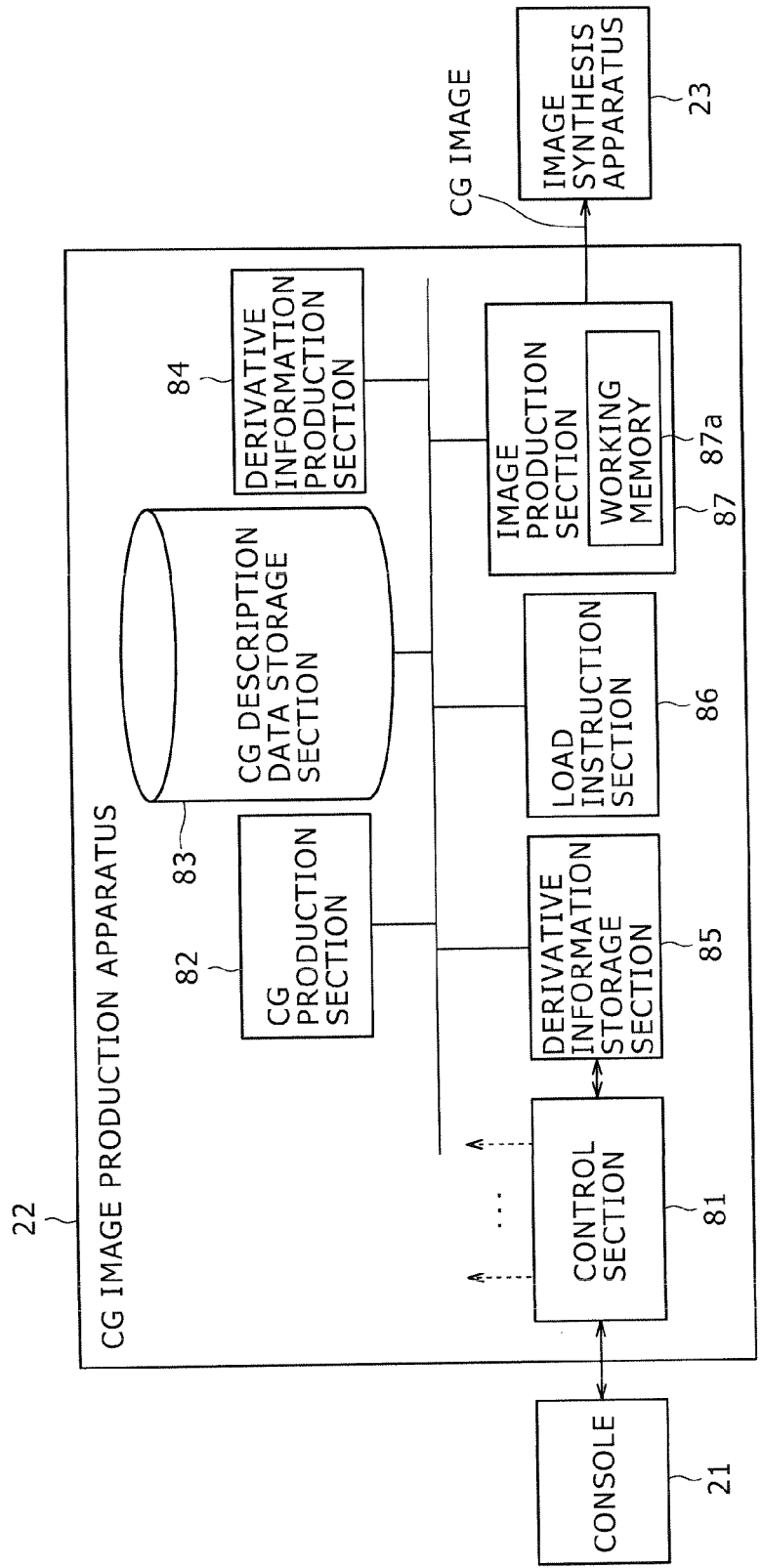
FIG. 4 is a block diagram showing a configuration of a CG image production apparatus shown in FIG. 1.

The CG image production apparatus 22 includes a built-in working memory, that is, a working memory 87a shown in FIG. 4, and develops and retains data corresponding to CG description data in the working memory. Then, the CG image production apparatus 22 works the contents of the data developed in the working memory in response to an operation signal from the console 21. In particular, for example, the CG image production apparatus 22 changes a parameter included in CG description data used upon production of a CG image in response to an operation signal from the console 21 to vary or modify the CG image to be produced.

Here, the CG description data signifies data which describes a CG material represented by the CG description data in a format in which the CG material can be edited.

It is to be noted that, in CG description data, a plurality of parameters necessary for production of a CG image are described or included. In particular, CG description data includes, for example, geometrical information, that is, apex coordinate values, of polygons which configure a CG, material information representative of attributes such as a color of a polygon surface, a texture mapping object designation parameter which designates a texture which represents an image to be mapped or applied to a polygon surface, a position parameter representative of a position at which a polygon is disposed, an attribute and a position of a virtual light, an attribute and a position of a virtual camera, information which configures a time line animation and so forth.

Further, for example, the CG image production apparatus 22 produces a CG image whose parameters are adjusted or changed based on the stored contents of the working memory, which correspond to CG description data after adjustment of the parameters. Then, the CG image production apparatus 22 supplies the produced CG image to the image synthesis apparatus 23.

The CG image production apparatus 22 carries out a CG image production operation such that, in the case where an image is a moving picture, the CG image production apparatus 22 refers to the contents of the working memory for each frame or for each field of the moving picture to produce a frame or a field of a CG image in accordance with the contents of the working memory referred to.

Accordingly, in the case where adjustment of parameters is carried out for each frame or for each field, the contents of the produced CG image vary for each frame or for each field.

To the image synthesis apparatus 23, not only a CG image from the CG image production apparatus 22 but also a synthesis object image which is an object of synthesis are supplied. The image synthesis apparatus 23 synthesizes the CG image from the CG image production apparatus 22 with the synthesis object image supplied thereto and outputs a synthesis image obtained by the synthesis.

In particular, for example, to the image synthesis apparatus 23, a picked up image obtained by image pickup of an announcer by means of a camera in a studio is supplied as the synthesis object image. Then, the image synthesis apparatus 23 synthesizes the picked up image as the synthesis object image and the CG image from the CG image production apparatus 22 using such a technique as superimpose or wipe and outputs a synthesis image obtained as a result of the synthesis.

The CG image produced by the CG image production apparatus 22 successively varies for each frame or for each field, from which a moving picture is configured, in response to updating of the contents retained in the working memory built in the CG image production apparatus 22. Therefore, for example, if the user or operator carries out operation of the console 21 while confirming the contents of the synthesis object image, then it is always possible to cause the CG image production apparatus 22 to produce and cause the image synthesis apparatus 23 to synthesize a CG image in accordance with a situation.

The CG image is updated for each frame or for each field from which a moving picture is configured, and a continuous smooth variation can be implemented and an impression free from unnaturalness can be provided to a person who observes the moving picture in which the CG image is synthesized.

Details of the Console 21

Now, details of the console 21 are described with reference to FIGS. 2 and 3.

Figure 2:
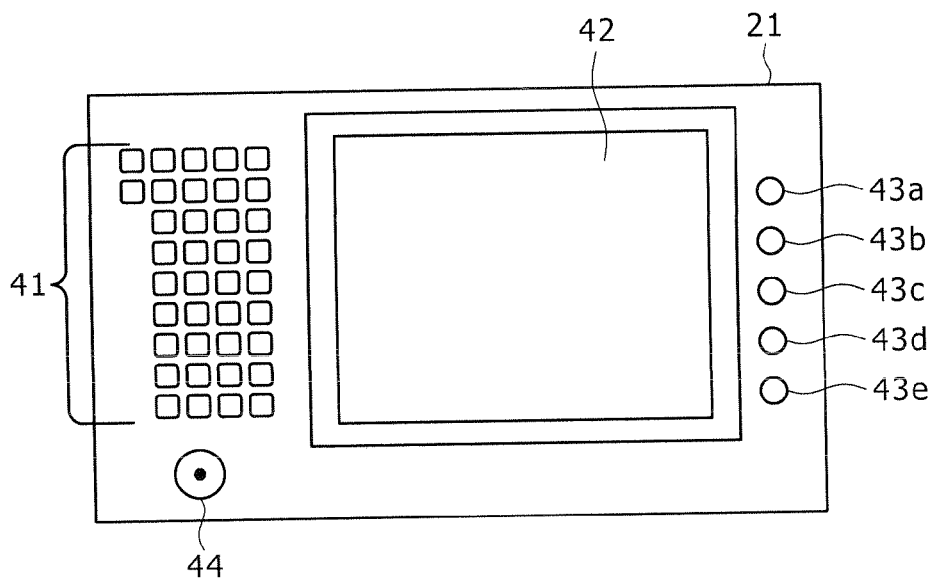
FIG. 2 is a top plan view showing an example of a console shown in FIG. 1.

FIG. 2 shows a top plan view of the console 21 as viewed from above.

For example, as shown in FIG. 2, the console 21 includes, in addition to operation buttons 41 for carrying out an operation such as an operation to cause a menu screen image to be displayed, and a display section 42 for displaying status parameters and so forth of the CG image production apparatus 22 and status parameters and so forth of the image synthesis apparatus 23 thereon. The console 21 further includes adjustment knobs 43a to 43e for adjusting an adjustment object parameter of CG, and a joystick 44 for adjusting various position parameters and so forth.

It is to be noted that, in the following description, in the case where there is no necessity to distinguish the adjustment knobs 43a to 43e from each other, the adjustment knobs 43a to 43e are each referred to simply as adjustment knob 43.

Figure 3:
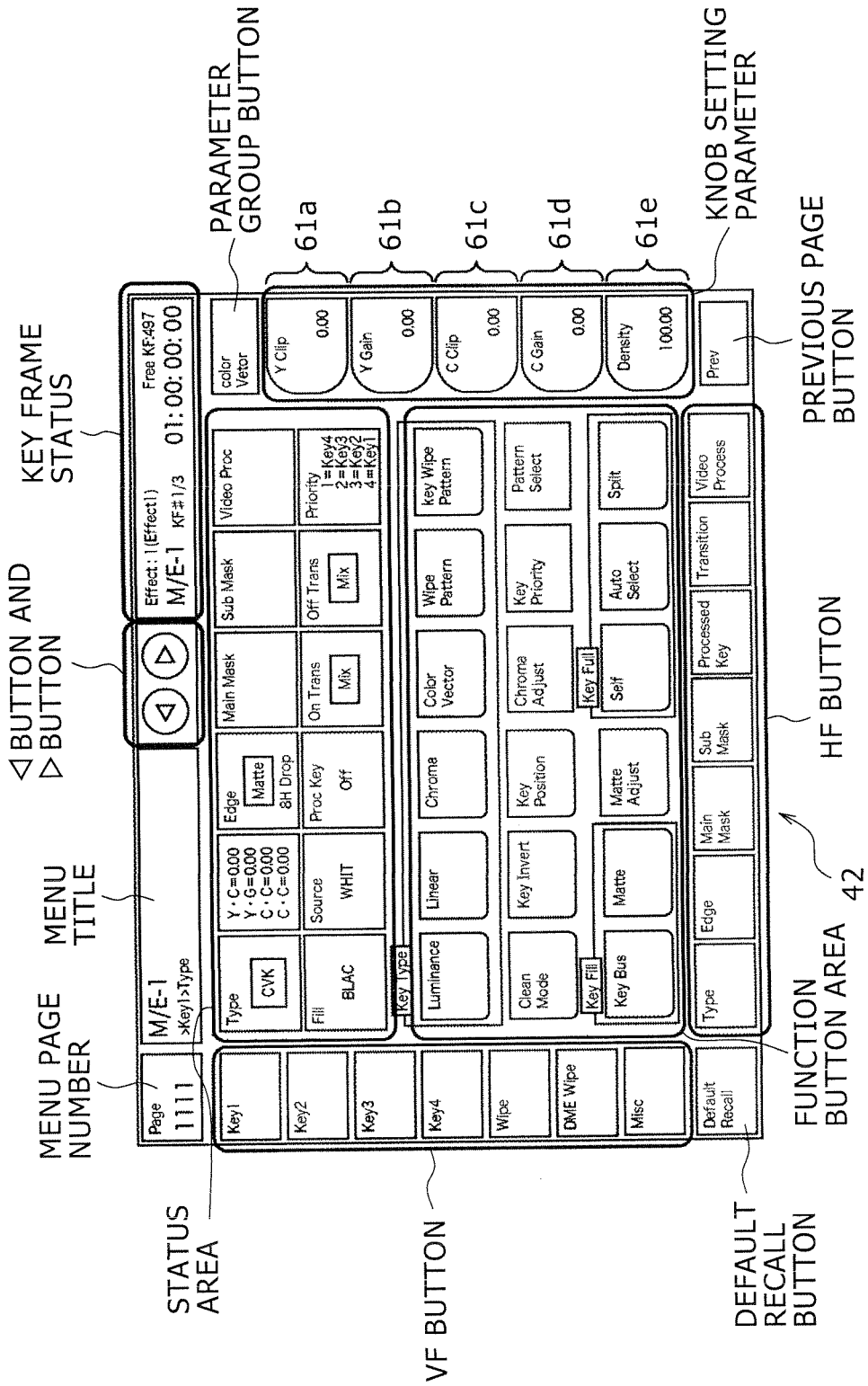
FIG. 3 is a schematic view showing an example of a display screen image of the console of FIG. 2.

FIG. 3 shows an example of a display screen image displayed on the display section 42 of the console 21.

Referring to FIG. 3, the display screen image of the display section 42 shown has regions 61a to 61e in which values of parameters adjusted by the adjustment knobs 43a to 43e, respectively, are displayed.

The display screen image of the display section 42 further displays a menu page number representative of a page number of a menu being displayed, a menu title representative of a title of the menu being displayed, a key frame status representative of a status of a key frame time line, a status area for displaying a status and so forth.

Furthermore, the display screen image of the display section 42 displays a leftwardly directed arrow mark button, a rightwardly directed arrow mark button, a VF button, a parameter group button, a default recall button, an HF button, a previous page button and so forth as well as a function button area in which buttons for causing various functions to be executed are disposed.

It is to be noted that the VF button and the HF button are similar to so-called function keys and have various functions. V of VF is an abbreviation of Vertical while H of HF is an abbreviation of Horizontal. By operating the VF button and the HF button, the functions to be allocated to the function button area and the adjustment knobs 43a to 43e vary.

It is to be noted that the buttons displayed in the image display screen of the display section 42 serve as a touch panel and are operated by the user.

The console 21 may further include a search dial or jog shuttle for controlling the progressing speed, that is, the reproduction speed, when a CG animation which is CG which varies together with time or the like is progressed or reproduced. It is to be noted that the CG animation or the like progressed by the search dial is displayed, for example, on a monitor or the like not shown connected to the CG image production apparatus 22.

Functions of the search dial are described. If the search dial is rotated on the console 21, then the direction for reproduction varies in response to the direction of the rotation. Further, the speed of reproduction varies in response to the speed of rotation when the search dial is rotated from its initial position.

It is to be noted that, when the search dial on the console 21 is to be used, it is necessary to depress, for example, an "ENBL" button not shown included in the operation buttons 41 and corresponding to the search dial used to place the "ENBL" button into a light emitting state.

The search dial has three operation modes including, for example, a jog mode, a shuttle mode and a variable mode. For example, if a "JOG" button, a "SHTL" button and a "VAR" button are provided as the operation buttons 41, then the operation mode of the search dial is set or changed such that the jog mode is established in response to depression of the "JOG" button; the shuttle mode is established in response to depression of the "SHTL" button; and the variable mode is established in response to depression of the "VAR" button. It is to be noted that one of the "JOG" button, "SHTL" button and "VAR" button which corresponds to the operation mode which is currently established is lit while the other buttons are unlit.

If the operation mode of the search dial is set to the jog mode, then the CG animation can be progressed at a progressing speed which increases in proportion to the speed of rotation of the search dial. In other words, while the CG image production apparatus 22 uses time in the CG animation as a parameter to be used for production of a CG image, it progresses the value of the time as the parameter together with the rotation of the search dial.

The progress of the CG animation corresponding to the rotation of the search dial is transmitted to the CG image production apparatus 22 for each frame or for each field. Consequently, the contents of a CG image produced by the CG image production apparatus 22 vary for each frame or for each field.

It is to be noted that, in order to stop the progress, the rotation of the search dial is stopped.

If the operation mode of the search dial is set to the shuttle mode, then the CG animation can be progressed at a progressing speed corresponding to the angle of rotation of the search dial. In other words, the value of the time in the animation used by the CG image production apparatus 22 varies at the progressing speed in response to the speed of rotation of the search dial.

In particular, for example, if the value for determining the progressing speed becomes 0.1 from the angle of rotation of the search dial, then production of a CG image is carried out for each frame or for each field while the value of the time as the parameter to be used for production of a CG image is progressed at a speed of 0.1 time the ordinary progressing speed.

Accordingly, even if the progressing speed is 0.1, not the CG image is changed in a frequency of once per 10 frames but the CG image to be produced for each frame or for each field is changed.

In the shuttle mode, if the search dial is rotated back to its initial position, at which a click sound is produced, then the progress stops.

If the operation mode of the search dial is set to the variable mode, then the progressing speed can be changed to a progressing speed from −1 time to 3 times in response to the angle of rotation of the search dial.

It is to be noted that the search dial is stopped at a position at which a first speed setting mode in which the progressing speed is set to −1 time is established, another position at which a second speed setting mode in which the progressing speed is set to 1 time is established and a further position at which a third speed setting mode in which the progressing speed is set to three times is established. In the variable mode, if the search dial is rotated and returned to its initial position, then reproduction stops.

It is to be noted that the effective range of the operation angle in the shuttle mode and the variable mode can be set from a menu screen which can be displayed on the display section 42 by operating the console 21.

In particular, the effective range of the operation angle, for example, in the shuttle mode can be set to a range from approximately −150 degrees to approximately 150 degrees or another range from approximately −180 degrees to approximately 180 degrees. Meanwhile, the effective range of the operation angle, for example, in the variable mode can be set to a range from −120 degrees to approximately 210 degrees, within which the operation angle is up to 120 degrees in the case where the progressing speed is one time, or another range from approximately −200 degrees to approximately 348 degrees, within which the operation angle is up to 200 degrees in the case where the progressing speed is one time.

Further, if a "STOP" button provided as one of the operation buttons 41 is depressed, then an operation of the search dial is invalidated and variable-speed reproduction by the search dial is canceled. Also when a "REW" button, a "PLAY" button, an "FF" button, an "STB OFF" button, an "ALL STOP" button or the like provided as the operation buttons 41 is depressed, variable-speed reproduction by the search dial is canceled similarly.

Details of the CG Image Production Apparatus 22

FIG. 4 shows an example of a configuration of the CG image production apparatus 22.

Referring to FIG. 4, the CG image production apparatus 22 includes a control section 81, a CG production section 82, a CG description data storage section 83, a derivative information production section 84, a derivative information storage section 85, a load instruction section 86 and an image production section 87 having a working memory 87a. It is to be noted that the components from the CG production section 82 to the image production section 87 mentioned are connected to each other by a bus.

The control section 81 receives an operation signal supplied thereto from the console 21. The control section 81 controls the CG production section 82, derivative information production section 84, load instruction section 86 and image production section 87 in response to the operation signal from the console 21.

In particular, for example, if the user uses the console 21 to carry out a list displaying operation for causing the display section 42 of the console 21 to display a list of derivative information files stored in the derivative information storage section 85, then the console 21 supplies an operation signal corresponding to the list displaying operation of the user to the control section 81.

It is to be noted that the derivative information file represents information representative of the contents which act upon CG description data including parameter designation information. Further, the derivative information file stores a plurality of pieces of derivative information which can be applied at a time to predetermined CG description data.

Further, a list of derivative information files represents a table of a plurality of derivative information files stored in the derivative information storage section 85. It is to be noted that, while a plurality of derivative information files are stored in the derivative information storage section 85, choices such as whether the implementation method of the derivative information storage section 85 is a hard disk or a semiconductor memory have no relation to the substance of the present invention, and therefore, description of such choices is omitted herein. This also applies similarly to choices regarding the CG description data storage section 83 and so forth.

If an operation signal corresponding to a list displaying operation of a user is supplied from the console 21, then the control section 81 reads out the list of derivative information files stored in the derivative information storage section 85 in response to the operation signal and supplies the read out list of derivative information files to the console 21. The console 21 displays the list from the control section 81 on the display section 42 thereof.

On the other hand, for example, if the user uses the console 21 to refer to the list of derivative information files displayed on the display section 42 of the console 21 and carry out a selection operation for selecting one of the derivative information files, then the console 21 produces an operation signal corresponding to the selection operation of the user and supplies the operation signal to the control section 81.

In this instance, the control section 81 controls the load instruction section 86 and the image production section 87 in response to the operation signal from the console 21 to adjust a parameter designated by a derivative information file selected by the selection operation of the user and carry out working of a CG image.

It is to be noted that a derivative information file includes a plurality of pieces of derivative information. Further, the derivative information is information including at least one of parameter designation information and parameter value indication information.

In particular, the control section 81 controls the load instruction section 86 and the image production section 87 to adjust the parameters designated by the parameter designation information individually corresponding to the plural pieces of derivative information included in the derivative information file selected by the selection operation of the user and carry out working of a CG image.

The CG production section 82 produces CG description data under the control of the control section 81 and supplies the produced CG description data to the CG description data storage section 83 through a bus 88 so as to be stored into the CG description data storage section 83. It is to be noted that this function of the CG production section 82 is utilized normally for preparations for operation to be carried out using the image production section 87.

What is significant in the description of the present invention is operation carried out using the image production section 87 from a state in which CG description data is stored in the CG description data storage section 83. Therefore, detailed description of this function of the CG production section 82 is omitted herein.

The CG description data storage section 83 retains or stores CG description data supplied thereto from the CG production section 82. It is to be noted that the CG description data is described by a schema language for defining a data structure such as, for example, COLLADA. Details of the CG description data described by the COLLADA are hereinafter described with reference to FIGS. 13 to 22.

It is to be noted that from where CG description data is supplied to the CG description data storage section 83 has no relation to the substance of the present invention, and CG description data may be supplied, for example, from a plurality of apparatus through a network.

Or, the CG description data storage section 83 itself may not be provided locally in the CG image production apparatus 22, but effects of the present invention can be exhibited even if the CG description data storage section 83 is replaced by a function of the CG image production apparatus 22 to download CG description data from the Internet when the CG image production apparatus 22 is to use the CG description data.

The derivative information production section 84 produces, for example, under the control of the control section 81, parameter designation information of designating an adjustment object parameter to be adjusted using the console 21 from among a plurality of parameters included in CG description data stored in the CG description data storage section 83.

Then, the derivative information production section 84 produces a derivative information file configured from derivative information including the parameter designation information produced thereby and supplies the produced derivative information file to the derivative information storage section 85 so as to be stored into the derivative information storage section 85.

It is to be noted that the derivative information includes, for example, at least one of parameter designation information and parameter value designation information representing that an adjustment object parameter is to be adjusted to a predetermined value.

The derivative information further includes an identifier for uniquely identifying CG description data which is to be made an object by the derivative information. In particular, the derivative information includes an identifier for uniquely identifying CG description data including a parameter designated by parameter destination information included in the derivative information or CG description data including a parameter whose change is indicated by parameter value indication information included in the derivative information.

In one derivative information file, parameter destination information or parameter value indication information included in derivative information can be applied to CG description data all at the same time.

In particular, for example, if derivative information includes parameter designation information and parameter value indication information, then a parameter designated by the parameter designation information included in the derivative information and a parameter whose change is indicated by the parameter value indication information included in the derivative information are both included in the same CG description data.

Data which cannot be applied at the same time are produced as different derivative information files and can be managed as different files.

Further, the derivative information production section 84 produces a list of a plurality of derivative information files stored in the derivative information storage section 85 and supplies the produced list to the derivative information storage section 85 so as to be stored into the derivative information storage section 85.

The derivative information storage section 85 retains a list of derivative information files supplied thereto from the derivative information production section 84.

The derivative information storage section 85 retains one or more derivative information files supplied from the derivative information production section 84. It is to be noted that derivative information which configures a derivative information file is described by a describing method which is prescribed by a schema on the XML (Extensive Markup Language). Details of the derivative information are hereinafter described with reference to FIGS. 23 to 28.

The load instruction section 86 read out, under the control of the control section 81, a derivative information file selected by a selection operation of a user from among a plurality of derivative information files stored in the derivative information storage section 85 from the derivative information storage section 85 and supplies the read out derivative information file to the image production section 87.

Further, the load instruction section 86 reads out CG description data identified with an identifier included in the derivative information file read out from the derivative information storage section 85 from among a plurality of CG description data stored in the CG description data storage section 83 from the CG description data storage section 83.

Then, the load instruction section 86 supplies the read out CG description data to the image production section 87 so as to be written or stored into the working memory 87a.

The image production section 87 supplies the CG description data supplied from the load instruction section 86 to the working memory 87a so as to be written into the working memory 87a. Then, the image production section 87 sets a parameter designated by the parameter designation information included in the derivative information in the derivative information file supplied from the load instruction section 86 from among a plurality of parameters included in the CG description data stored in the working memory 87a.

In particular, after an adjustment object parameter is set, if a parameter controlling instruction or the like provided from the outside through a communication path is received, then the image production section 87 carries out updating of the value of the adjustment object parameter. It is to be noted that it is possible to set not one but a plurality of parameters as adjustment object parameters.

It is to be noted that, where a plurality of parameters are set as adjustment object parameters, the adjustment object parameters are identified from each other using parameter identifiers (id).

In particular, a parameter controlling instruction supplied from the outside through the communication path includes a value of a parameter identifier, and the image production section 87 applies the parameter controlling instruction to control of an adjustment object parameter corresponding to the parameter identifier of the instruction.

For example, the numbers 1, 2, 3, 4 and so forth may be allocated to the individual adjustment knobs 43 and the allocated numbers may be used as parameter identifiers such that the parameter identifiers are included in communication of a parameter controlling instruction.

In this instance, an adjustment object parameter to be changed in accordance with the parameter controlling instruction includes a parameter identifier transmitted together with the parameter controlling instruction, and an adjustment object parameter including a parameter identifier same as the parameter identifier transmitted together with the communication of the parameter controlling information is determined as an object of the parameter controlling instruction.

Further, the image production section 87 adjusts an adjustment object parameter under the control of the control section 81. In particular, for example, if the user carries out an adjustment operation for adjusting the adjustment object parameter using the console 21, then the console 21 produces and supplies an operation signal corresponding to the adjustment operation of the user to the control section 81.

In this instance, the control section 81 controls the image production section 87 in response to the operation signal from the console 21 so that the adjustment object parameter may have a value corresponding to the adjustment operation of the user.

In particular, for example, if an instruction to add a numerical value of 1.5 is received, then the image production section 87 reads out a value of the adjustment object parameter from the working memory 87a under the control of the control section 81 and adds 1.5 to the read out value of the adjustment object parameter. Then, the image production section 87 writes the new adjustment object parameter obtained by the addition back into the working memory 87a, that is, stores the new adjustment object parameter by overwriting into the working memory 87a.

The operation after reproduction of an operation signal till writing into the working memory 87a is carried out at a timing corresponding to each frame or each field of a moving picture image.

It is to be noted that the console 21 produces, in response to depression of the default recall button displayed on the display screen of the console 21, an operation signal for corresponding default recall and supplies the produced operation signal to the control section 81.

In this instance, the control section 81 carries out initialization of returning an adjustment object parameter included in CG description data stored in the working memory 87a of the image production section 87 to an adjustment object parameter before it is adjusted by the adjustment operation of the user in response to the default recall operation signal from the console 21.

In particular, for example, the control section 81 controls the load instruction section 86 in response to the default recall operation signal from the console 21 to read out CG description data including the adjustment object data from the CG description data storage section 83 and supply the read out CG description data to the image production section 87. Then, the control section 81 controls the image production section 87 to store the CG description data supplied from the load instruction section 86 to the image production section 87 into the working memory 87a by overwriting.

Consequently, the CG description data stored in the working memory 87a is the CG description data before it is adjusted by an adjustment operation of the user.

Or as another example, the region of the working memory 87a is increased such that, upon first loading of CG description data, CG description data is developed and written in a similar manner into two regions.

Then, one of the two regions is used as an object of an adjustment operation of a user and used for image production while the other one of the regions is left having the first value and is used as a region to be read when a default recall operation signal is received. Even this configuration can implement dealing with a default recall operation signal.

Further, the image production section 87 can supply CG description data having an adjusted adjustment object parameter to the CG description data storage section 83 so as to be stored into the CG description data storage section 83 by overwriting.

The image production section 87 may be configured otherwise such that CG description data after the adjustment object parameter is adjusted is stored not by overwriting but a new storage region is produced in the CG description data storage section 83 and the CG description data is stored into the new storage region.

The image production section 87 produces a CG image based on CG description data stored in the working memory 87*a* after the adjustment object parameter is adjusted or updated, and supplies the produced CG image to the image synthesis apparatus 23. As a result, the adjustment operation of the user is reflected on the CG image to be outputted from the image production section 87.

Since this operation is carried out for each frame or for each field, CG images on which an adjustment operation of a user is reflected successively and immediately can be confirmed, and alto it becomes possible to use CG images on which an adjustment operation of the user is reflected as they are for broadcasting and so forth.

It is to be noted that CG description data developed in the working memory 87*a* not necessarily remain having the contents of the CG description data read in as they are. Further, upon utilization of the present invention, the contents of the CG description data read in need not remain as they are. For example, if a description which can be handled by some other apparatus but cannot be handled by the CG image production apparatus 22 is included, the description portion may be ignored such that a description portion which cannot be handled by the CG image production apparatus 22 is not provided in or written into the working memory 87*a*.

Further, in order to make a data structure easy to handle when CG description data is used for production of a CG image, the data structure of the CG description data read in may be re-constructed and disposed in the working memory 87*a*. In the present specification, the description "to develop" is used so as to include such a case that CG description data is worked in this manner.

It is to be noted that the CG description data may be supplied from the outside. Further, a configuration which allows CG description data stored in the CG description data storage section 83 of the CG image production apparatus 22 to be taken out to the outside of the CG image production apparatus 22 may be adopted. Operation of the CG Image Production Apparatus 22

Now, a CG parameter adjustment process carried out by the CG image production apparatus 22 is described with reference to a flow chart of FIG. 5.

This CG parameter adjustment process is started, for example, when the user carries out a list displaying operation using a operation button 41 of the console 21. At this time, the console 21 produces an operation signal corresponding to the list displaying operation of the user and supplies the operation signal to the control section 81.

At step S1, the control section 81 reads out a list of derivative information files from the derivative information storage section 85 in response to an operation signal from the console 21 and supplies the read out list to the console 21. In response to this, the console 21 causes the list of derivative information files from the control section 81 to be displayed on the display section 42 of the console 21.

The user would use the operation buttons 41 of the console 21 to carry out a selection operation of selecting one of the plural derivative information files displayed as a list of derivative information files while referring to the list of the derivative information files displayed on the display section 42 of the console 21.

In this instance, the console 21 produces an operation signal corresponding to the selection operation of the user and supplies the operation signal to the control section 81.

At step S2, the control section 81 controls the load instruction section 86 in response to the operation signal from the console 21. The load instruction section 86 reads out the derivative information file selected by the selection operation of the user from the derivative information storage section 85 under the control of the control section 81 and supplies the read out derivative information file to the image production section 87.

At step S3, the load instruction section 86 reads out, from the CG description data storage section 83, CG description data identified by an identifier included in the derivative information file read out from the derivative information storage section 85 from among a plurality of CG description data stored in the CG description data storage section 83.

Then, at step S4, the load instruction section 86 supplies the read out CG description data to the image production section 87 so as to be stored into the working memory 87*a*.

At step S5, the image production section 87 sets a parameter designated by parameter designation information in the derivative information file from the load instruction section 86 from among a plurality of parameters included in the CG description data stored in the working memory 87*a* to an adjustment object parameter.

At step S6, the image production section 87 decides based on the derivative information file from the load instruction section 86 whether or not the derivative information file includes parameter value indication information. If it is decided that the derivative information file includes parameter value indication information, then the processing advance to step S7.

At step S7, the image production section 87 overwrites, based on the parameter value indication information included in the derivative information file from the load instruction section 86, a parameter, with regard to which an instruction to write the value upon loading is issued depending upon the parameter value indication information, from among a plurality of parameters included in the CG description data stored in the working memory 87*a*.

It is to be noted that, if it is decided at step S6 that the derivative information file does not include parameter value indication information based on the derivative information file from the load instruction section 86, then the image production section 87 advances the processing to step S8 skipping the step S6.

At step S8, the image production section 87 produces, based on the CG description data stored in the working memory 87*a*, a corresponding CG image and supplies the produced CG image to the monitor or the like not shown so as to be displayed.

It is to be noted that, if a still picture texture file or a shader is annexed to the CG description data, then it is used additionally to produce a CG image. Further, while the produced CG image is supplied to the monitor, the destination of the produced CG image may otherwise be an apparatus which broadcasts or signals the CG image or an apparatus for storing an image such as a VTR (Video Tape Recorder).

Also it is possible to use a configuration wherein a storage such as a hard disk is provided in the CG image production apparatus 22 such that a produced CG image is stored once into the storage.

Then, the user would refer to the CG image displayed on the monitor or the like not shown and use the adjustment knobs 43, as occasion demands, joystick 44 or the like of the console 21 to carry out an adjustment operation for adjusting the adjustment object parameter. In this instance, the console 21 produces and supplies an operation signal corresponding to the adjustment operation of the user to the control section 81.

At step S9, the control section 81 decides whether or not the user uses the console 21 to carry out an adjustment operation.

In particular, for example, the control section 81 decides based on reception of an operation signal from the console 21 whether or not an adjustment operation is carried out by the user. In this instance, the processing returns to step S8 repetitively until it is decided that an adjustment operation is carried out by the user so that the process of production of an image and checking of reception are repetitively carried out.

It is to be noted that, in the case where the CG is an animation, or in some other control or the like, an image to be outputted is sometimes varied for each frame or for each field. Therefore, even in the case where an adjustment operation of the user is not carried out, the CG image production apparatus 22 carries out, as standard operation, operation of production of a CG image based on the stored contents of the working memory 87a for each frame or for each field.

Then, if it is decided based on an operation signal from the console 21 that an adjustment operation is carried out by the user, then the control section 81 advances the processing to step S10. At step S10, the control section 81 controls the image production section 87 so as to adjust the adjustment object parameter stored in the working memory 87a to a value corresponding to the adjustment operation of the user.

The image production section 87 adjusts the adjustment object parameter stored in the working memory 87a under the control of the control section 81 and returns the processing to step S8.

Then at step S8, the image production section 87 produces, based on the CG description data stored in the working memory 87a and having the adjustment object parameter adjusted, a corresponding CG image and supplies the produced CG image to the monitor or the like not shown so as to be displayed. Thereafter, similar processes are carried out.

It is to be noted that this CG parameter adjustment process is ended, for example, when an operation for ending the production of a CG image is carried out by the user using the console 21. At this time, for example, the image production section 87 goes into a state in which a black image is outputted. It is to be noted that, if outputting itself of an image signal is ended, then a bad influence may be had on a monitor or various apparatus connected at the succeeding stage or an image which is disagreeable to an observing person may be displayed. Therefore, preferably a correct image signal for displaying, for example, a dark picture image is outputted.

As described above, in the CG parameter adjustment process, an adjustment object parameter designated by designation information can be adjusted or changed in response to an adjustment operation of a user using the adjustment knobs 43a to 43e or the joystick 44 of the console 21.

Therefore, in the CG parameter adjustment process, when a CG image is to be synthesized, in response to the adjustment operation of a user, the contents of a CG image to be produced can be changed readily only by adjusting an adjustment object parameter. Therefore, for example, in comparison with an alternative case in which a CG producer works a CG work, an CG image to be produced can be worked rapidly and the cost required for working of the CG image can be suppressed lower.

Further, since operation suitable for the situation of the contents of an image to be used other than the CG image can be carried out to change the CG image, the added value of a final image, for example, to be broadcast can be raised.

It is to be noted that, while the CG image production apparatus 22 in the CG synthesis system 1 is configured from the components from the control section 81 to the image production section 87, for example, the CG production section 82 and/or the CG description data storage section 83 from among the components from the control section 81 to the image production section 87 which configure the CG image production apparatus 22 may be provided externally and connected by a LAN cable or the like.

Figure 6:
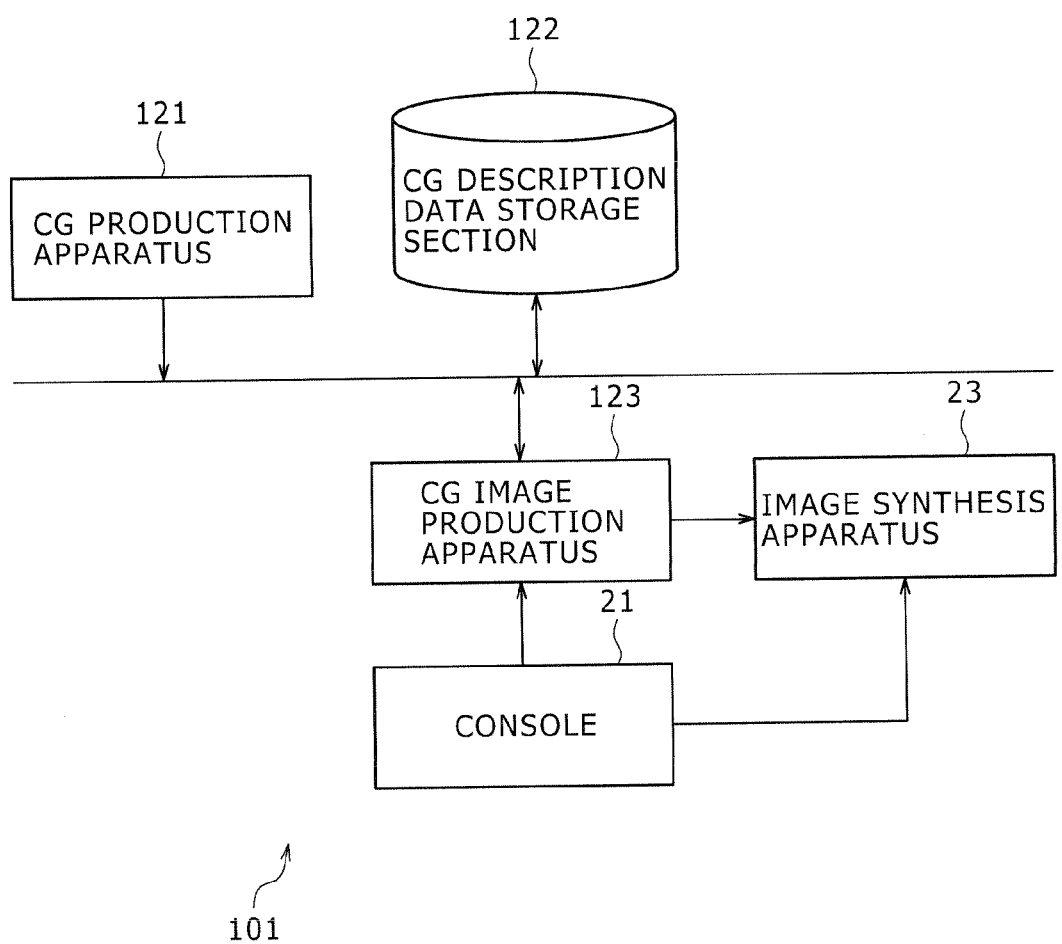
FIG. 6 is a block diagram showing another example of a configuration of the CG synthesis system according to the first embodiment of the present invention.

In particular, such a configuration of a CG synthesis system 101 as shown in FIG. 6 may be adopted.

Referring to FIG. 6, the CG synthesis system 101 shown includes, in addition to the console 21 and the image synthesis apparatus 23, a CG production apparatus 121 having functions similar to those of the CG production section 82 of the CG image production apparatus 22, a CG description data storage section 122 having functions similar to those of the CG description data storage section 83 of the CG image production apparatus 22 and a CG image production apparatus 123 having functions similar to those of the CG image production apparatus 22 from which the CG production section 82 and the CG description data storage section 83 are removed. The console 21, image synthesis apparatus 23, CG production apparatus 121, CG description data storage section 122 and CG image production apparatus 123 are connected to each other by a LAN cable or the like.

<2. Second Embodiment>

Example of the Configuration of the CG Synthesis System 141

Figure 7:
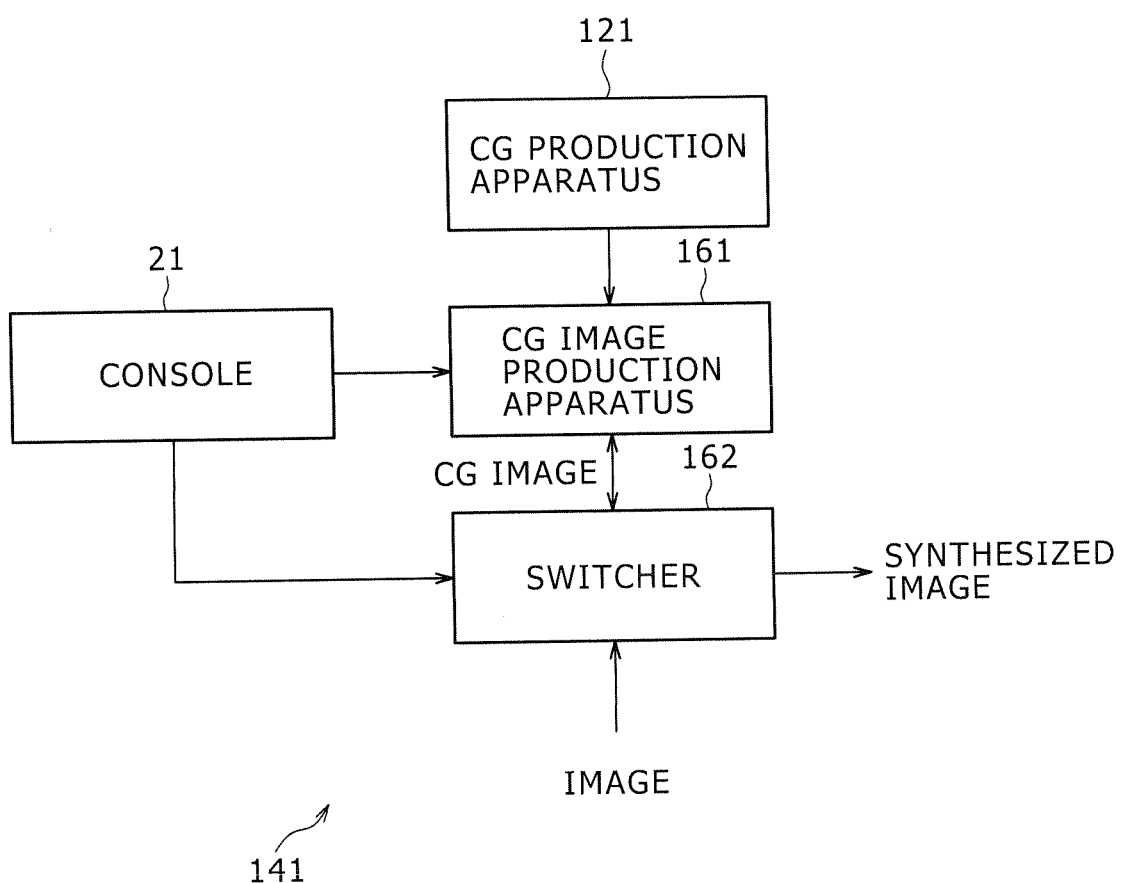
FIG. 7 is a block diagram showing an example of a configuration of a CG synthesis system according to a second embodiment of the present invention.

FIG. 7 shows an example of a configuration of a CG synthesis system 141 according to a second embodiment of the present invention.

The CG synthesis system 141 includes a console 21, a CG production apparatus 121, a CG image production apparatus 161 and a switcher 162.

The console 21 and the CG production apparatus 121 are configured similarly to those described hereinabove with reference to FIG. 6, and therefore, overlapping description of them is omitted herein to avoid redundancy. Further, positioning and details of the CG production apparatus 121 have no relationship to the substance of the present invention as described hereinabove.

The CG image production apparatus 161 receives an operation signal supplied thereto from the console 21. The CG image production apparatus 161 carries out, upon production of a CG image, such processes as mapping an image for texture supplied thereto from the switcher 162 and so forth based on an operation signal from the console 21. Then, the CG image production apparatus 161 supplies a CG image obtained by the processes to the switcher 162.

The switcher 162 is controlled by an operation signal from the console 21. It is to be noted that it is possible to adopt, as an applied configuration, a configuration wherein an additional control signal is sent from the CG image production apparatus 161 to the switcher 162 in response to a state of the CG image production apparatus 161 such as a value of a parameter in a CG.

A plurality of images are supplied to the switcher 162. The switcher 162 supplies an image designated by the console 21 from among the plural images supplied thereto to the CG image production apparatus 161 under the control of the console 21.

It is to be noted that, as the console 21 in this instance, a console having a configuration for operating functions of various switchers 162 such as changeover selection of an image, that is, a configuration of a console of a switcher publicly known can be used apparently in addition to the configuration of a pushbutton and so forth described hereinabove.

Further, a plurality of synthesis object images are supplied to the switcher 162. The switcher 162 selects one of the plural synthesis object images supplied thereto as a synthesis object image to be used for synthesis with the CG image under the control of the console 21.

Then, the switcher 162 synthesizes the CG image from the CG image production apparatus 161 with the selected synthesis object image and outputs a synthesis image obtained by the synthesis. For the synthesis, various functions such as superimpose, wipe, mix and picture-in-picture syntheses which are functions of a known switcher.

Example of the Configuration of the CG Image Production Apparatus 161

Figure 8:
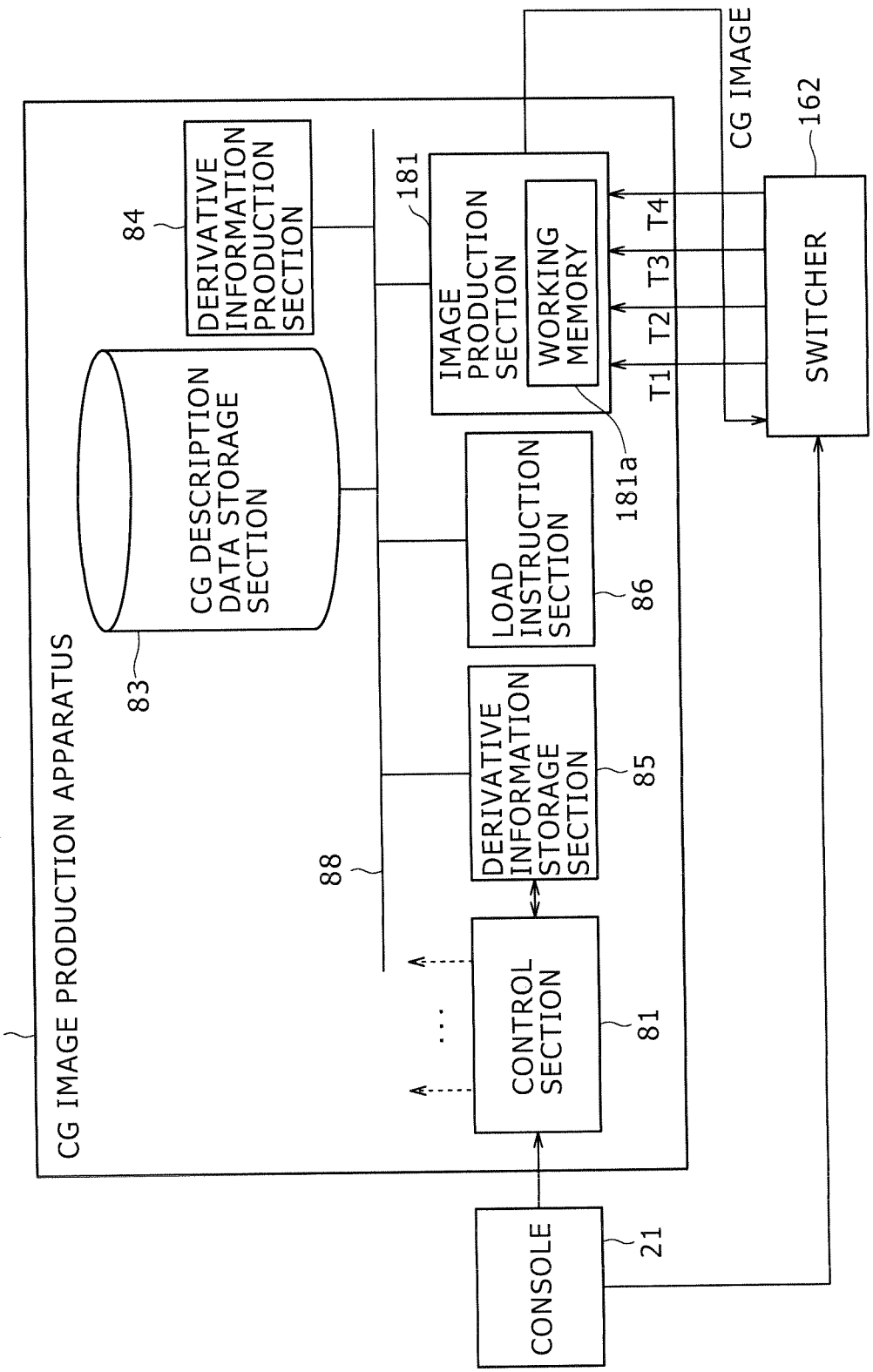
FIG. 8 is a block diagram showing an example of a configuration of a CG image production apparatus shown in FIG. 7.

FIG. 8 shows an example of a configuration of the CG image production apparatus 161.

Referring to FIG. 8, the CG image production apparatus 161 shown includes several common components to those of the CG image production apparatus 22 of FIG. 4, and overlapping description of the common components is suitably omitted herein to avoid redundancy.

In particular, the CG image production apparatus 161 is configured similarly to the CG image production apparatus 22 except that it includes an image production section 181 having a working memory 181a in place of the image production section 87 of the CG image production apparatus 22 and the CG production section 82 is omitted.

To the image production section 181, a derivative information file and corresponding CG description data are supplied from the load instruction section 86 similarly as in the case of the image production section 87. The image production section 181 supplies the CG description data from the load instruction section 86 to the working memory 181a so as to be stored into the working memory 181a.

Further, to the image production section 181, an image which can be used for texture mapping to polygons which configure a CG image to be produced based on the CG description data stored in the working memory 181a is supplied from the switcher 162.

The image production section 181 sets a parameter designated by parameter designation information in the derivative information file from the load instruction section 86 from among a plurality of parameters included in the CG description data stored in the working memory 181a to an adjustment object parameter.

In particular, if the parameter designation information in the derivative information file from the load instruction section 86 designates, for example, a texture mapping object indication parameter from among parameters included in the CG description data stored in the working memory 181a, then the image production section 181 sets the texture mapping object indication parameter to an adjustment object parameter.

Then, the image production section 181 adjusts the adjustment object parameter under the control of the control section 81. Consequently, the texture mapping object parameter set to the adjustment object parameter is adjusted or changed.

As an another example, if the parameter designation information in the derivative information file designates a coordinate value parameter of a polygon object, then the image production section 181 sets the coordinate value parameter to an adjustment object parameter. Then, the image production section 181 adjusts or changes the coordinate value parameter of the polygon object under the control of the control section 81.

Further, the image production section 181 produces a CG image based on the contents of the working memory 181a after the adjustment object parameter is adjusted and supplies the produced CG image to the switcher 162.

It is to be noted that, as an applied configuration, the image production section 181 controls the switcher 162.

Then, the image production section 181 carries out, based on the CG description data stored in the working memory 181a, such processes as to map an image for texture mapping supplied, for example, from the switcher 162 to polygons which configure a CG image to be produced. Then, the image production section 181 supplies a CG image obtained by the processes to the switcher 162.

The derivative information file can include a number of an input signal to the image production section 181 to be texture mapped as a designation of texture mapping.

In FIG. 8, four different image signals from T1 to T4 are supplied from the switcher 162 to the image production section 181, and it is possible to designate to which polygon one of the image signals is to be texture mapped.

In particular, it is possible to designate one of the four different image signals supplied from the switcher 162 to the image production section 181 so as to be texture mapped to a polygon which satisfies a predetermined condition.

Further, the derivate information file can include a designation relating to details of texture mapping and can indicate, for example, affine transformation of a texture coordinate. Also it is possible make such a designation as to determine whether or not texture mapping should be carried out depending upon a different parameter in a CG.

It is to be noted that the control section 81 of the CG image production apparatus 161 controls the derivative information production section 84, load instruction section 86 and image production section 181 in response to an operation signal from the console 21.

Example of the Configuration of the Switcher 162

Figure 9:
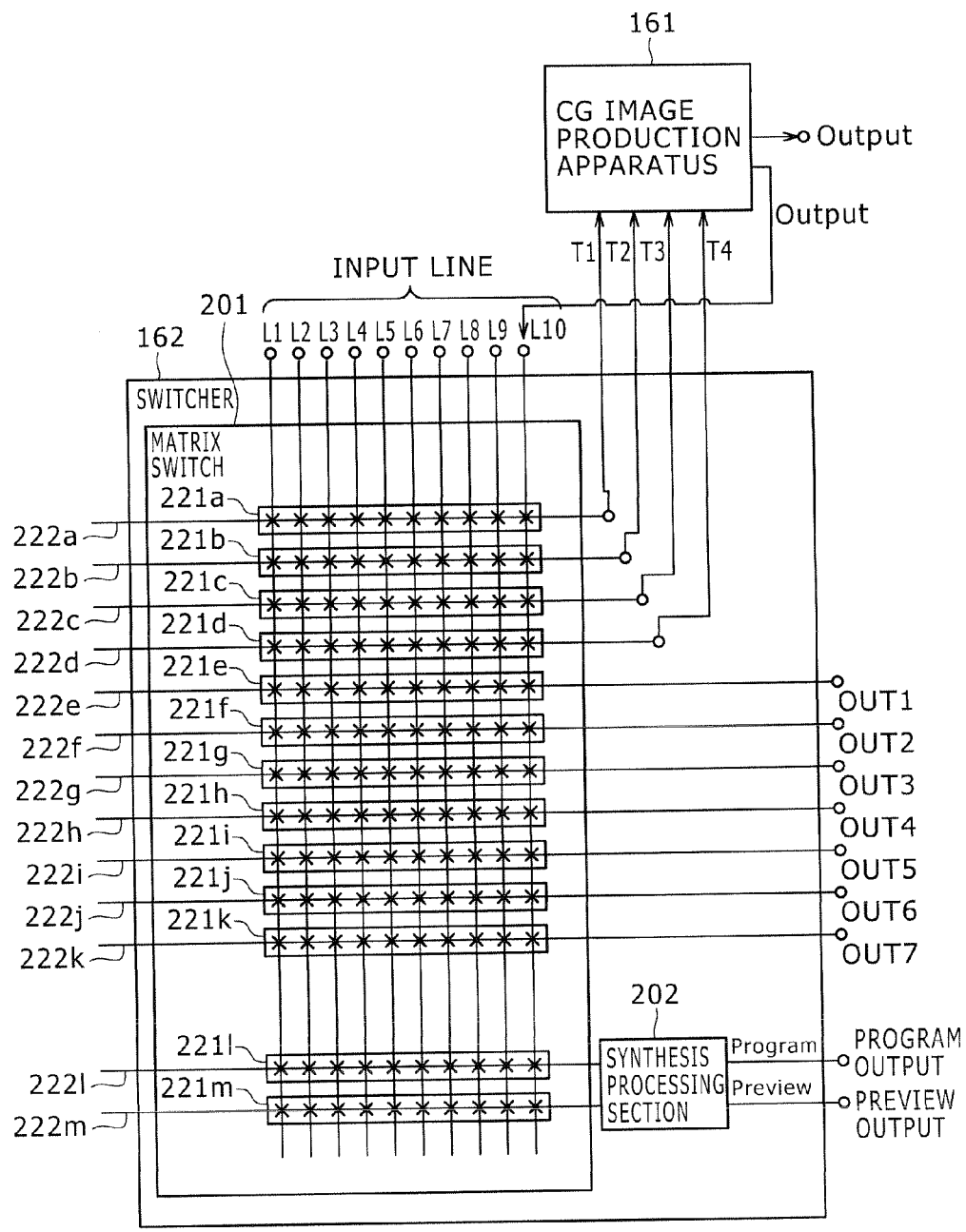
FIG. 9 is a block diagram showing an example of a configuration of a switcher shown in FIG. 7.

FIG. 9 shows an example of a configuration of the switcher 162.

The switcher 162 includes a matrix switch 201 and a synthesis processing section 202. The switcher 162 further includes a control section not shown. It is to be noted that the switcher 162 is shown configured only from representative functioning elements of a known switcher, and it is apparent that a switcher having a more complicated configuration and functions can be adopted in place of the switcher 162.

The matrix switch 201 is configured from input lines L1 to L10, cross point switches 221a to 221m, and bus lines 222a to 222m and is controlled by the control section not shown.

To the input lines L1 to L9 from among the input lines L1 to L10, image signals are inputted individually, and to the input line L10, a CG image is inputted from the CG image production apparatus 161.

It is to be noted that, while it is described that a CG image is inputted from the CG image production apparatus 161 to the input line L10 from among the input lines L1 to L10, the input line to which a CG image is to be inputted is not limited to this. Even if a configuration wherein a plurality of CG images are inputted from a plurality of input lines is adopted, the present invention can be applied to production of CG images although only the number of input lines for inputting CG images increases.

Further, while the matrix switch 201 described above has the 10 input lines L1 to L10, the number of input lines is not limited to 10 but may be any number.

The cross point switch 221a controls connection of points, indicated by × marks in FIG. 9, at which the bus line 222a and the input lines L1 to L10 cross with each other. The cross point switch 221a thus supplies one of images inputted to the input lines L1 to L9 to the CG image production apparatus 161 through the bus line 222a and the terminal T1.

It is to be noted that, although also it is possible to select an image signal from the CG image production apparatus 161, since it does not occur with the configuration of FIG. 9 that a CG image is selected, it is described above that one of the input lines L1 to L9 is selected.

It is to be noted that the cross point switches 221b to 221d are configured similarly to the cross point switch 221a and carry out processing similar to that carried out by the cross point switch 221a.

In particular, the cross point switch 221b supplies one of image signals inputted individually to the input lines L1 to L9 to the CG image production apparatus 161 through the bus line 222b and the terminal T2. Meanwhile, the cross point switch 221c supplies one of image signals individually inputted to the input lines L1 to L9 to the CG image production apparatus 161 through the bus line 222c and the terminal T3.

Further, the cross point switch 221d supplies one of image signals individually inputted to the input lines L1 to L9 to the CG image production apparatus 161 through the bus line 222d and the terminal T4.

The cross point switch 221e controls connection of points at which the bus line 222e and the input lines L1 to L10 and outputs one of images individually supplied from the input lines L1 to L10 to a terminal OUT1 through the bus line 222e.

It is to be noted that the cross point switches 221f to 221k are configured similarly to the cross point switch 221e and carries out processing similar to that carried out by the cross point switch 221e.

The cross point switch 221l controls connection of points at which the bus line 222l and the input lines L1 to L10 cross with each other and supplies one of images individually inputted from the input lines L7 to L10 to the synthesis processing section 202 through the bus line 222l.

The cross point switch 221m controls connection of points at which the bus line 222m and the input lines L1 to L10 cross with each other and supplies one of images individually inputted from the input lines L1 to 110 to the synthesis processing section 202 through the bus line 222m.

The synthesis processing section 202 synthesizes a synthesis object image from the cross point switch 221l and another synthesis object image from the cross point switch 221m. Then, the synthesis processing section 202 outputs a synthesis image obtained by the synthesis to a preview output line which outputs the synthesis image as a preview and a program output line which outputs the synthesis image as a final synthesis image with the contents according to control of the control section.

While the foregoing is description regarding the configuration of the switcher 162 of FIG. 9, also it is possible to adopt a switcher of a more complicated configuration and use the switcher for synthesis of images.

It is to be noted that, since a more complicated configuration of the switcher does not have a relationship to the substance of the present invention, description of the same is omitted herein.

Operation of the CG Image Production Apparatus 161

Figure 10:
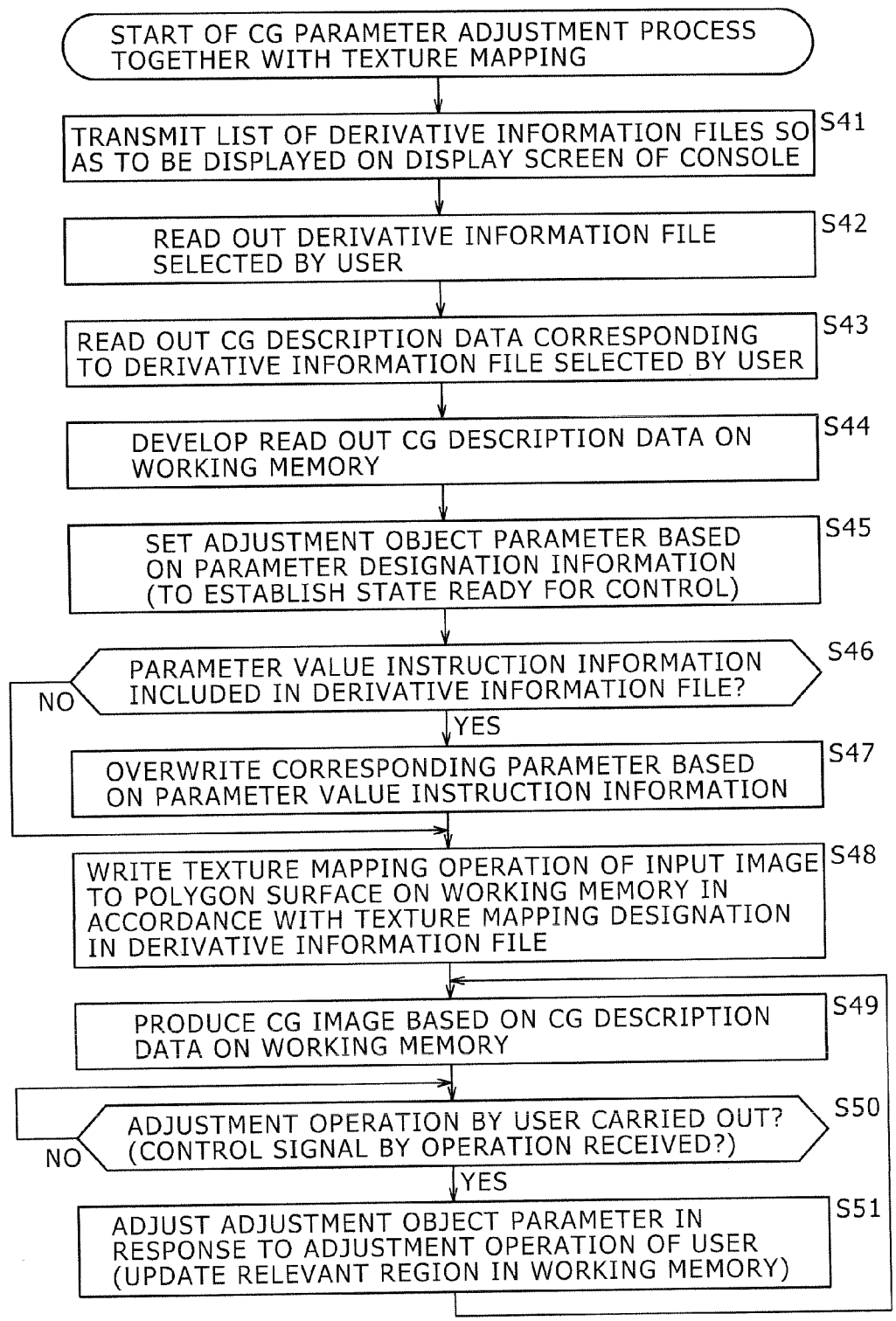
FIG. 10 is a flow chart illustrating a CG parameter adjustment process together with texture mapping carried out by the CG image production apparatus of FIG. 8.

Now, a second CG parameter adjustment process together with texture mapping which is carried out by the CG image production apparatus 161 is described with reference to a flow chart of FIG. 10.

This mapping adjustment process is started, for example, when the user carries out a list displaying operation using the operation button 41 of the console 21. At this time, the console 21 produces an operation signal corresponding to the list displaying operation of the user and supplies the operation signal to the control section 81.

At steps S41 to S47, processes similar to those at steps S1 to S7 of FIG. 5 described hereinabove, respectively, are carried out.

It is to be noted that, at step S45, the image production section 181 sets at least a texture mapping object indication parameter from among a plurality of parameters included in CG description data stored in the working memory 181a as an adjustment object parameter.

At step S48, the image production section 181 carries out writing into the working memory 181a such that texture mapping of an input image to the surface of polygons is carried out in accordance with a texture mapping designation in the derivative information file. Consequently, the contents stored in the working memory 181a are changed to contents necessary to carry out texture mapping.

It is to be noted that the switcher 162 selects those images to be individually outputted to the terminals T1 to T4 from among a plurality of images inputted from the input lines L1 to L9 under the control of the console 21. Then, the switcher 162 supplies the selected images to the image production section 181 through the terminals T1 to T4.

It is to be noted that, if it is assumed that the system includes a plurality of CG image production apparatus 22, then it is possible to utilize the system such that an image outputted from one of the CG image production apparatus 22 is supplied to another one of the CG image production apparatus 22.

At step S49, the image production section 181 produces a GC image to which images for texture from the switcher 162 are texture mapped based on CG description data stored in the working memory 181a. It is to be noted that also it is possible to supply a CG image produced by the image production section 181 to the monitor or the like not shown so as to be displayed.

Then, the user would cause the CG images supplied to the input lines L1 to L10 of the switcher 162 to be supplied to the monitor or the like not shown through the synthesis processing section 202 such that a program output or a preview output, which is part of a final image, is displayed on the monitor or the like not shown, and refer to the CG image displayed on the monitor or the like. Then, as occasion demands, the user would use the adjustment knobs 43, the joystick 44 or the like of the console 21 to carry out an adjustment operation of adjusting an adjustment object parameter. In this instance, the console 21 produces and supplies an operation signal corresponding to the adjustment operation of the user to the control section 81.

By such a configuration as described above, adjustment of a CG image which is an element within an image for which various synthesizing processes are carried out by the switcher 162 can be carried out on the real time basis using the console 21. Since the operations are carried out for each frame or for each field of an image, it is possible to apply smooth variation or transition to an image.

Figure 5:
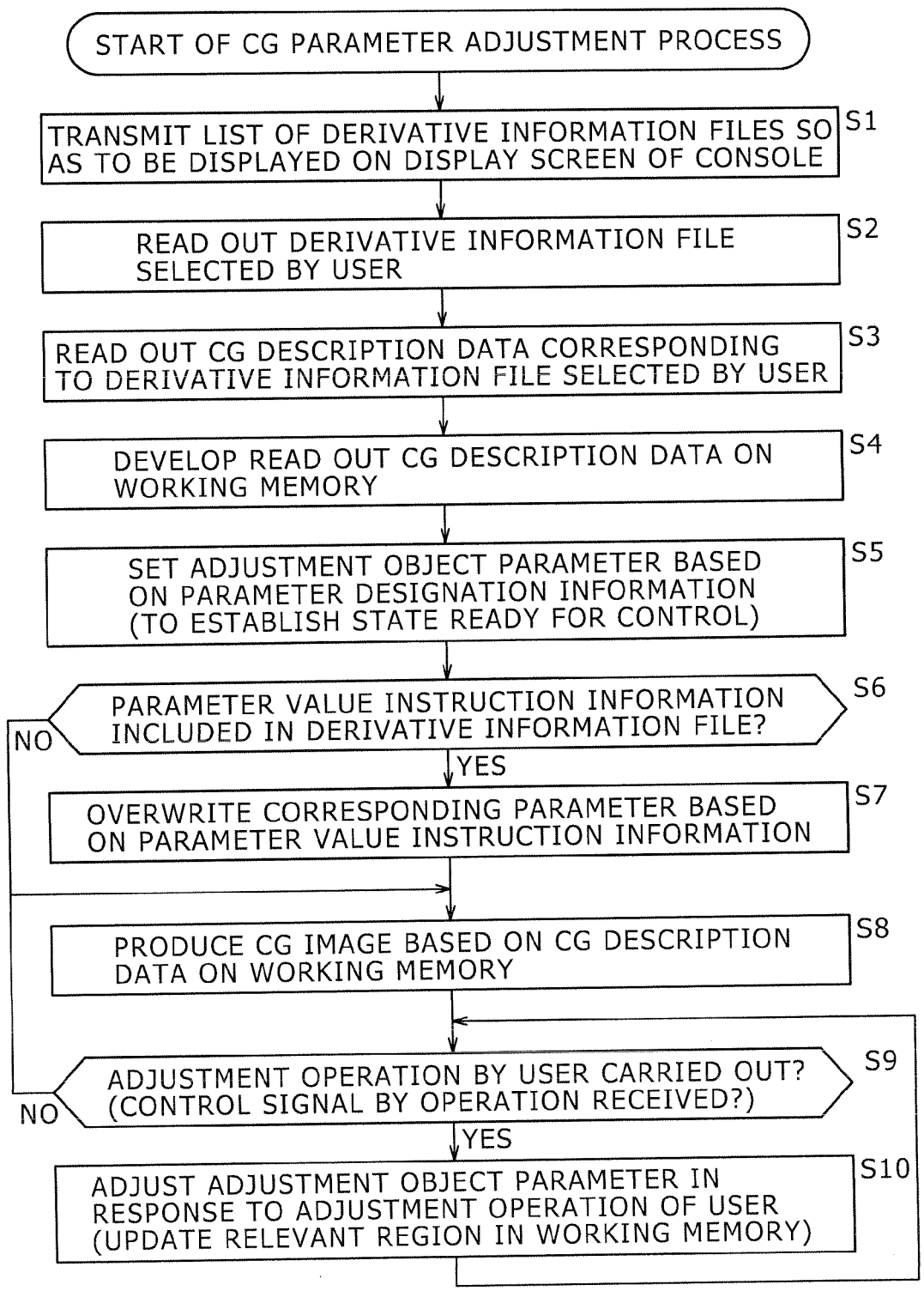
FIG. 5 is a flow chart illustrating a CG parameter adjustment process carried out by the CG image production apparatus of FIG. 4.

At step S50, the control section 81 decides whether or not the user carries out an adjustment operation using the console 21 in a similar manner as in the case at step S9 of FIG. 5. Then, if it is decided based on an operation signal from the console 21 that the user carries out an adjustment operation, then the control section 81 advances the processing to step S51. At step S51, the control section 81 controls the image production section 181 to adjust the adjustment object parameter stored in the working memory 181a to a value corresponding to the adjustment operation of the user.

The image production section 181 adjusts the adjustment object parameter stored in the working memory 181a under the control of the control section 81 and then returns the processing to step S49.

In particular, for example, the image production section 181 adjusts the texture mapping object indication parameter set to the adjustment object parameter so as to be made different from that which is currently indicated under the control of the control section 81. Then, the image production section 181 returns the processing to step 949.

Here, the texture mapping object indication parameter which is indicated as an object of texture mapping is a parameter which designates the surface of polygons which configure a CG in a unit of a CG object which is a set of polygons or a parameter which designates a material definition which defines in what manner the surface of the polygons looks.

In the case where the material definition is indicated as a texture mapping object, texture mapping is applied to the entire surface of the polygon for which the pertaining material definition is used.

It is to be noted that details of the contents of texture mapping are designated using a designation of a UV coordinate similarly to an ordinary texture mapping process of a CG. The designations can be made when a CG work is produced, that is, when CG description data is produced or can be described in the derivative information file.

At step S49, the image production section 181 carries out texture mapping in a manner as indicated by the texture mapping object indication parameter as the adjustment object parameter adjusted by the processing at the immediately preceding step S51.

It is to be noted that the CG parameter adjustment process together with the texture mapping is ended, for example, when an ending operation for ending the production of a CG image is carried out by the user using the console 21.

Then, the user can operate the switcher 162 through the console 21 and so forth to control the configuration of an image to be outputted from the synthesis processing section 202 irrespective of whether or not the CG image from the CG image production apparatus 161 should be utilized.

Functions of the switcher 162, an operation for the switcher 162 and operation of the switcher 162 are known techniques, and therefore, detailed description of them is omitted herein.

As described above, in a CG parameter adjustment process together with texture mapping, that is, in a process in the case where the CG image production apparatus 161 texture maps an input image, for example, a texture mapping object indication parameter set to the adjustment object parameter is adjusted in response to an adjustment operation of the user so that one of images selected by the switcher 162 and supplied to the image production section 181 can be texture mapped to an object in desired CG.

Consequently, it is possible to readily change an object face in CG to be texture mapped.

Further, selection of an image itself to be used for texture mapping can be carried out by controlling the matrix switch 201 of the switcher 162, that is, the cross point switches 221a to 221m, and the user may carry out a selection operation of the cross point switches 221a to 221m similarly to an operation of an ordinary switcher.

Incidentally, in the second embodiment, the CG image production apparatus 161 in the CG synthesis system 141 is configured from the control section 81, components from the CG description data storage section 83 to load instruction section 86 and the image production section 181 as described above. However, for example, the derivative information production section 84 and the derivative information storage section 85 from among the control section 81, components from the CG description data storage section 83 to the load instruction section 86 and image production section 181 which configure the CG image production apparatus 161 may be provided externally and connected by a LAN cable or the like.

Figure 11:
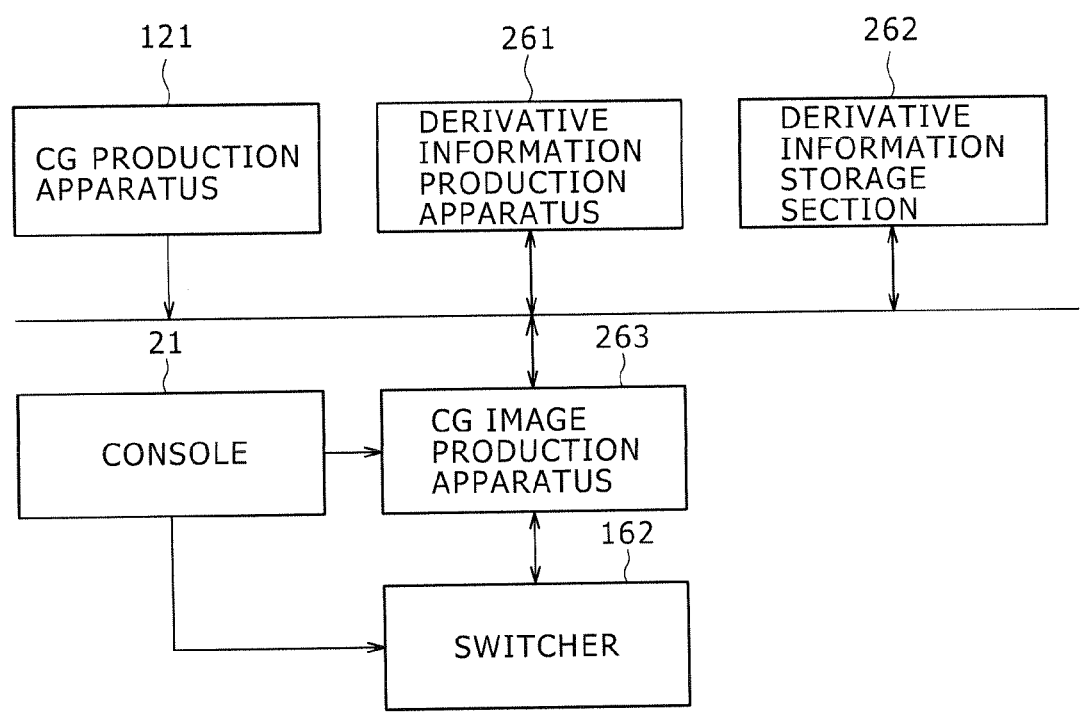
FIG. 11 is a block diagram showing another example of a configuration of the CG synthesis system according to the second embodiment of the present invention.

In particular, for example, the CG synthesis system 141 of FIG. 7 may be replaced by a CG synthesis system 241 configured in such a manner as seen in FIG. 11. Referring to FIG. 11, the CG synthesis system 241 includes a console 21, a CG production apparatus 121 and a switcher 162 as well as a derivative information production apparatus 261 having functions similar to those of the derivative information production section 84 of the CG image production apparatus 161, a derivative information storage section 262 having functions similar to those of the derivative information storage section 85 of the CG image production apparatus 161 and a CG image production section 263 having functions similar to those of the CG image production apparatus 161 from which the derivative information production section 84 and the derivative information storage section 85 are omitted. These components are connected by LAN cable or the like.

Further, for example, in the CG synthesis system 241 of FIG. 11, the derivative information production apparatus 261 may be configured such that it has the derivative information storage section 262.

As an example wherein the present invention is applied and effectively utilized for broadcasting, for example, an image in which a picture regarding repeating of a soccer game is displayed is determined as a synthesis object image and information regarding players displayed on the synthesis object image is represented by small CG, and this is prepared as CG description data.

Then, the position of a CG image produced based on the prepared CG description data on a synthesis object image is operated through the console 21. Since a player displayed in the synthesis object image is normally moving in the synthesis object image, if the CG image is drawn at a fixed position, then it cannot be provided as a display image corresponding to the player to the viewer.

With the present embodiment, since the position of a CG image on a synthesis object image can be operated to change while the contents of the synthetic object image are viewed, rendering following up the movement of a player can be carried out. Consequently, broadcasting of a high value which is welcomed by a viewer can be achieved.

Example of the Software Configuration

Figure 12:
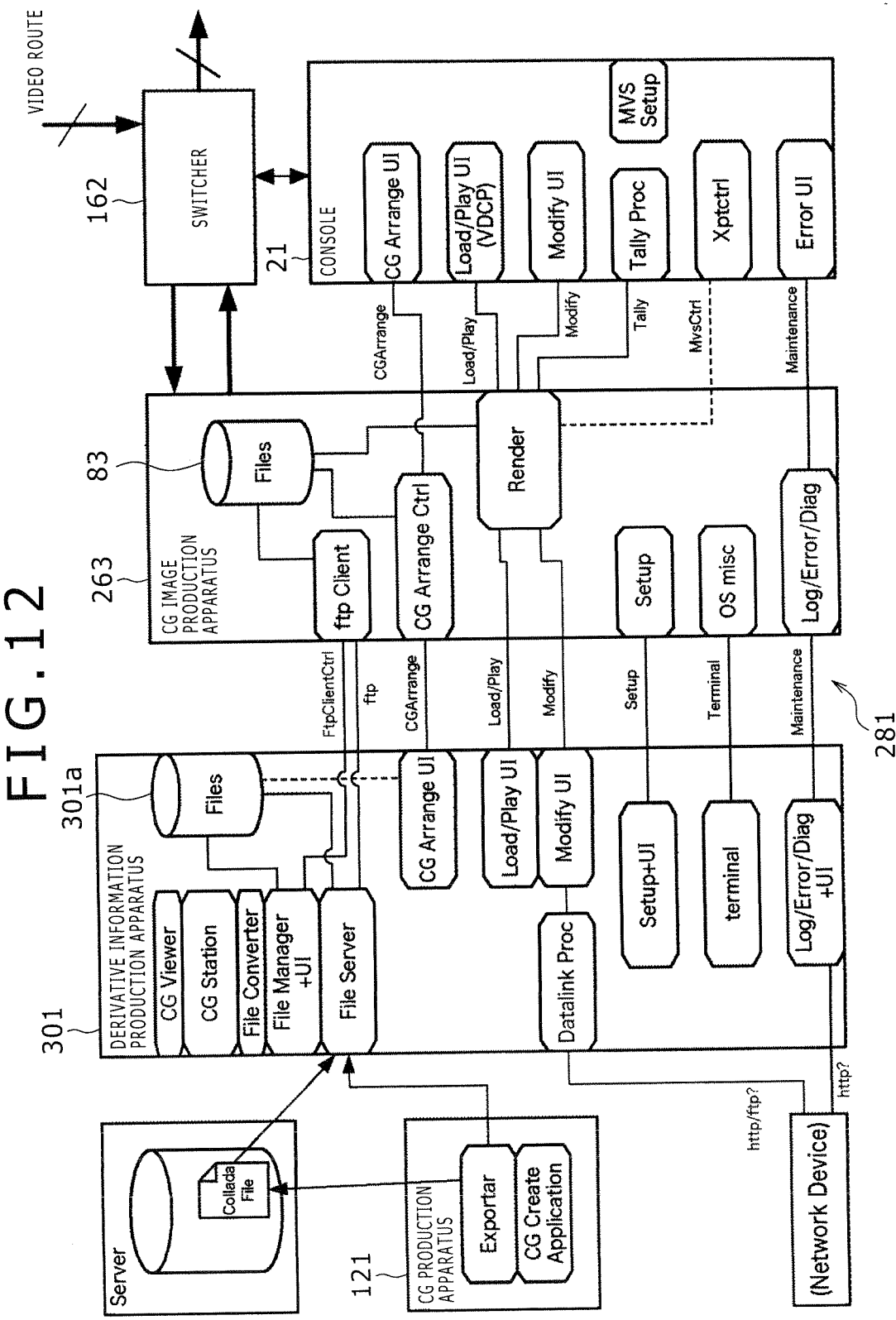
FIG. 12 is a block diagram showing an example of a software configuration of a CG synthesis system to which the present invention is applied.

FIG. 12 illustrates a detailed software configuration of a CG synthesis system 281 which is a different example to which the present invention is applied.

It is to be noted that the CG synthesis system 281 of FIG. 12 is configured similarly to the CG synthesis system 241 of FIG. 11 except that it includes a derivative information production apparatus 301 in place of the derivative information production apparatus 261 and the derivative information storage section 262.

The derivative information production apparatus 301 functions also as a console having a console function of the CG image production section 263 and may have a hardware configuration which includes various operation sections in addition to a known personal computer.

In the following, the contents of FIG. 12 are described. In FIG. 12, a rectangle indicates one apparatus or device, and a chamfered rectangle, that is, an octagon, indicates a software module.

The CG production apparatus 121 is, for example, a personal computer which is operated by a user and produces and outputs a file of CG description data by the Exporter which is a CG production software application built in the personal computer.

The console 21 principally has a function of operating the switcher 162 and is configured similarly to a console for operating a known switcher, and therefore, detailed description thereof is omitted herein.

Further, the console 21 may include the graphical user interface. Or it is possible for the console 21 to control the CG image production apparatus 263.

The derivative information production apparatus 301 supplies a file of CG description data produced by and supplied from the CG production apparatus 121 to the CG image production section 263 so as to be stored into the CG description data storage section 83 (indicated as "Files" in FIG. 12) of the CG image production section 263. Thereupon, a file transfer technique between apparatus through a network is used.

As a path of file transfer, a file is transferred from the CG production apparatus 121 to a Server, transferred from the Server to a storage 301a of the derivative information production apparatus 301, and then transferred from the storage 301a to the CG description data storage section 83 of the CG image production section 263.

This operation is implemented using a File Server function and a File Manager function of the derivative information production apparatus 301 and a ftp Client function of the CG image production section 263.

Or, the file may be transferred from the CG production apparatus 121 to the derivative information production apparatus 301 without by way of the Server. It is to be noted that it is possible to set the transfer between the apparatus such that, when a file is placed into a predetermined directory, the file is transferred immediately so that the burden on the operator is reduced and file transfer free from miss of a file to be transferred can be carried out.

In this instance, the software may be configured such that the contents of the set relevant directory are supervised or watched periodically or irregularly by a timer function or the like which is implemented by software of the apparatus, and if a new file becomes available, then transfer of the file is carried out.

Simultaneously with transfer of CG description data, a file for use for rendering, that is, for image production, is transferred together. In particular, a texture file including a still picture to be applied to the surface of polygons and a shader file including a program for image production are transferred together.

Consequently, a texture and a shader intended by a CG producer can be used on the CG image production section 263.

When the texture file and the shader file transferred thereto are received, the CG image production section 263 carries out format conversion, compile and so forth for the received texture file and shader file so that they can be used for image production.

Then, the CG image production section 263 utilizes a conversion result obtained by applying the format conversion, compile and so forth simultaneously with CG description data stored in the CG description data storage section 83 to produce an image.

It is to be noted that, while the CG production apparatus 121 described above is included in the CG synthesis system 281, the present invention is characterized in a processing configuration after CG description data is acquired. Accordingly, even in the case where CG description data is received from an external apparatus which is not included in the CG synthesis system 281, the present invention can be applied.

"CG Arrange UI" of the derivative information production apparatus 301 and the console 21 undergoes an operation for producing the contents of a derivative information file and communicates with "CG Arrange UI" of the CG image production section 263.

"CG Arrange UI" of the derivative information production apparatus 301 produces a derivative information file including parameter designation information and so forth and stores the produced derivative information file into the Files 83. In particular, the CG description data storage section 83 functions also as a derivative information storage section.

"Render" of the CG image production section 263 corresponds to the image production section 87 or the image production section 181 and has a built-in working memory similar to the working memory 87a or the working memory 181a. "Render" of the CG image production section 263 produces a CG image similarly to the image production section 87 and the image production section 181.

It is to be noted that, in FIG. 12, only arrow marks extending from and to the switcher 162 indicate rough flows of an image signal while the other connecting lines indicate logical communication paths.

"Setup" of the CG image production section 263 provides a function of changing and storing a setup.

"OS misc" of the CG image production section 263 provides various standard services. "Log/Error/Diag" of the CG image production section 263 provides a function for maintenance. In particular, for example, "Log/Error/Diag" of the CG image production section 263 records a log of various operations of the CG image production section 263 and provides the recorded log to the external apparatus different from the CG image production section 263 or renders a self diagnosis function operative in response to an instruction from the external apparatus.

In the derivative information production apparatus 301 and the console 21, "Load/Play UI" functions as a load instruction section for loading a file of CG description data into "Render." "Modify UI" functions as parameter operation means to be used for adjustment of a parameter and transmits an operation of a user to the CG image production section 263. It is to be noted that the adjustment knob 43 is an example of "Modify UI."

In the derivative information production apparatus 301, "Datalink Proc" provides a link function for using external data for change of a parameter in place of a physical operation of a user, and terminal functions as a client of various services.

Further, in the derivative information production apparatus 301, "Log/Error/Diag +UI" provides a maintenance function of the derivative information production apparatus 301 itself and a maintenance function of the CG image production section 263.

Further, in the derivative information production apparatus 301, "File Converter" provides a function of converting CG description data of a format which cannot be handled by the CG image production section 263 into CG description data of another format which can be handled by the CG image production section 263.

Further, in the derivative information production apparatus 301, "CG Viewer" and "CG Station" provide a function for displaying a preview of CG of the screen of the personal computer.

In the console 21, "Tally Proc" receives and produces information (tally) of an input picture included in an output picture, and "MVS Setup" is a function of carrying out setting of a switcher.

In the console 21, "Xptctrl" is a function of controlling a cross point of the switcher under the control of the external apparatus and particularly controlled by the Render section of the CG image production section 263. "Xptctrl" receives, when such setting as to select a cross point of the switcher, for example, in response to the value of a certain parameter in CG is made, a signal for cross point control in response to the value of the relevant parameter of a CG image to be produced in the Render section for each frame or for each field, that is, a result which changes by advancement of an animation time line or a result which changes by an operation set by the parameter designation information. Then, "Xptctrl" carries out image selection through one of the buses of the switcher.

It is to be noted that, while an example wherein cross point control is carried out is described, the operation of the switcher which is controlled by "Render" is not limited to this, but the switcher may be configured such that various functions thereof are controlled by an internal state of CG being handled by "Render." In the console 21, "Error UI" provides a maintenance function such as error display and so forth.

Example of CG Description Data

FIGS. 13 to 22 illustrate an example of CG description data. It is to be noted that any part which is an unnecessary portion is omitted and represented by " . . . " in the figures.

The CG description data is described, for example, by COLLADA as a schema language which defines a data structure. It is to be noted that, on the left side in FIGS. 13 to 22, a line number representative of in what numbered line a character string representative of CG description data described by the COLLADA is is indicated. This similarly applies also to FIGS. 23 to 28 hereinafter described.

In the description given with reference to FIGS. 13 to 22, only important portions of CG description data are described while description of the other portions is suitably omitted. Details can be recognized by referring to description of, for example, "COLLADA: Sailing the Gulf of 3D Digital Content Creation by R?mi Arnaud, Mark Barnes ISBN: 978-1-56881-287-8" and so forth.

In the fourth to eleventh lines, an image of texture or the like to be mapped to polygons which configure a CG image to be produced based on CG description data is defined. In the twelfth to 28th lines, a material representative of a manner in which the surface of a CG object displayed as a CG image looks is defined.

It is to be noted that, particularly as the contents of the material, for example, a color of the surface, a pattern and so forth of the CG object are defined.

The 29th to 69th lines include a portion which becomes the contents of the material and define an effect obtained, for example, when light is irradiated virtually upon the CG object. In particular, for example, in the 30th to 64th lines, as an effect in the case where light is irradiated upon the CG object, in what manner the irradiated light is reflected on the CG object and so forth are defined.

In the 70th to 205th lines, apex information representative of a shape of polygons, UV coordinates of the polygons and so forth are defined. Further, in the 206th to 361st lines, information which configures an animation time line regarding a CG animation produced based on the CG description data is defined. Furthermore, in the 362nd to 371st lines, a virtual light which virtually irradiates light upon the CG object is defined. A shadow and so forth which appear on the CG object are calculated in response to light from the virtual light.

In the 372nd to 385th lines, a virtual camera which virtually carries out image pickup of the CG object is defined. This virtual camera carries out image pickup of the CG object as an image pickup object, and an image which corresponds to a picked up image obtained by the image pickup is outputted as the CG image.

Accordingly, the manner in which CG objects to be outputted as the CG image look varies in response to the posture or position of the virtual image.

In the 386th to 449th lines, disposition information such as a three-dimensional position, in a virtual space in which solid bodies such as the CG object, virtual light, virtual camera and so forth exist, of the solid bodies is defined. In particular, for example, in the 388th and 389th lines, the three-dimensional position (x, y, z) of a polygon of parallelepiped, that is, a polygon represented by "Box01," is a three-dimensional position (−34.706497, 8.764190, −0.076581).

Further, for example, in the 398th line, a three-dimensional position (x, y, z) of another polygon of a parallelepiped, that is, a polygon represented by "Box02," is defined, and in the 399th to 415th lines, three-dimensional positions (x, y, z) and so forth of a plurality of character strings, that is, character strings represented by "Text01" to "Text05," and so forth are defined. However, part of the contents is omitted.

Further, in the 416th to 422nd lines, a three-dimensional position (x, y, z) and a posture of the virtual light, that is, a virtual light represented by "Spot01," are defined, and in the 423rd to 425th lines, a three-dimensional position (x, y, z) of the CG object upon which light from the virtual light is irradiated is defined. Further, in the 426th to 432nd lines, a three-dimensional position (x, y, z) and a posture of the virtual camera, that is, a virtual camera represented by "Camera01," are defined. Further, in the 433rd to 446th lines, a three-dimensional position (x, y, z) and so forth of a polygon of a sphere, that is, a polygon represented by "Sphere01," are defined. In the 447th line, a three-dimensional position (x, y, z) and so forth of a polygon of a cone, that is, a polygon represented by "Cone01," are defined similarly as in the 433rd to 446th lines. However, part of the contents is omitted.

Example of the Derivative Information File

FIGS. 23 to 28 illustrate an example of the contents of a derivative information file including parameter designation information. It is to be noted that the following description is given principally of what parameters are designated as the adjustment object parameter and description of the other matters is suitably omitted herein.

Referring to FIGS. 23 to 28, "patsample1.dae" in the ninth line indicates a name of CG description data corresponding to this derivative information file, that is, represents a file name. In particular, if an instruction to load this derivative information file is received, then the CG image production apparatus 263 acquires the name of the CG description data from this line and loads the CG description data, that is, reads the CG description data into the working memory.

The seventh line indicates the place of a directory in which the CG description data and so forth are placed.

The 28th to 34th lines list up names of materials included in the corresponding CG description data, that is, definitions of the attribute of the surface. Although this information can always be obtained if the CG description data is analyzed, it is listed here so that it can be utilized readily for designation of texture mapping and so forth.

Parameter Designation Information which Designates a Color Described as Contents of a Material The 36th to 63rd lines describe parameter designation information which designates the color of a material defined in the CG description data, that is, of a material represented by "id2_Material," as an adjustment parameter. It is to be noted that, in the 36th line, an adjustment knob 43 which is to be used when the color designated as the adjustment object parameter is adjusted, that is, one of the adjustment knobs 43 which corresponds to 'id="modifier_01"' and 'name="nob01"' and is the first one as represented by "01" at the tail of them.

Further, the parameter designation information designates, in the 39th to 51st lines, a color recognized from light emitted from the CG object itself (particularly in the 40th and 41st lines) and a color recognized from reflected light from the CG object in response to illumination from the virtual light (particularly in the 45th to 47th lines) as adjustment object parameters.

In particular, this parameter designation information describes in the 42nd line that a parameter (index 0) indicative of a red color component of a color recognized from light emitted from the CG object itself is designated. Similarly, the parameter designation information describes in the 48th line that a parameter "index 0" indicative of a red color component of light recognized from reflected light from the CG object by illumination is designated.

In other words, the red color components of the color recognized from the light emitted from the CG object itself and the color recognized from the reflected light from the CG object by illumination can be controlled in response to an operation of the adjustment knob 43.

Further, for example, the parameter designation information designates in the 53rd line that the information representative of the colors as the adjustment object parameters is made an object of an operation by one time without multiplying the same by a value within the range from "0" to "1.0."

Further, for example, the parameter designation information designates in the 55th line that values obtained by adding an offset value described in the 55th line to the adjustment object parameters adjusted in response to an adjustment operation of the user are handled as final values of the adjusted adjustment object parameters.

Further, for example, the parameter designation information designates, in the 57th and 58th lines, an operation mode of the adjustment knob 43 designated in the 36th line. In particular, in the 57th and 58th lines, an operation mode in which the adjustment object parameters are adjusted within the range from "0" to "1.0" linearly in response to the angle of rotation of the adjustment knob 43, that is, in proportion to the angle of rotation of the adjustment knob 43 is designated.

For example, in the case where an operation mode of the adjustment knob 43 is designated as an attribute annexed to the parameter designation information as described in the 57th and 58th lines, the image production sections 87 and 181 set, based on the information supplied from the load indication section 86, the operation mode of the corresponding adjustment knob 43 to the operation mode designated by the information.

Parameter Designation Information which Designates the Position of the Virtual Camera The 64th to 78th lines describe parameter designation information which designates the position in a virtual space in which the virtual camera defined in the CG description data exists as an adjustment object parameter. This designation information designates, particularly in the 65th to 71st lines, the position y from within the three-dimensional position (x, y, z) in the virtual space at which the virtual camera exists is designated as an adjustment object parameter.

It is to be noted that, in the 64th line, the adjustment knob 43 which is used for adjustment of the position y of the virtual camera designated as an adjustment object parameter and corresponds to 'name="nob02"' in the 64th line is designated.

Parameter Designation Information which Designates that Only One of a Plurality of CG Objects is Rendered The 79th to 89th lines describe special parameter designation information which designates selection instruction information for the instruction to render only that one of a plurality of designated polygons from among polygons defined in the CG description data which corresponds to the parameter as an adjustment parameter.

More particularly, for example, this parameter designation information designates, in the 79th line, an adjustment knob 43 used upon adjustment of the selection indication information designated as an adjustment object parameter and corresponding to 'name="nob03"' in the 64th line.

Further, for example, the parameter designation information indicates in the 81st line that nothing is selected in the case of the parameter "0" using a null character string " ".

Further, this parameter designation information describes in the 83rd to 87th lines that, if the parameter becomes "1" by an operation of the adjustment knob 43, then only a polygon having the name of "Text01" should be selected to carry out rendering; that, if the parameter becomes "2," then only a polygon having the name of "Text02" should be selected to carry out rendering; that, if the parameter becomes "3," then only a polygon having the name of "Text03" should be selected to carry out rendering; that, if the parameter becomes "4," then only a polygon having the name of "Text04" should be selected to carry out rendering; and that, if the parameter becomes "5," then only a polygon having the name of "Text05" should be selected to carry out rendering.

Parameter Designation Information which Designates a Control Parameter

The 90th to 95th lines describe parameter designation information which designates that a control parameter cited in the 262nd to 266th lines hereinafter described is designated as an adjustment object parameter.

This parameter designation information designates, in the 90th line, an adjustment knob 43 which is used when the control parameter designated as an adjustment object parameter is adjusted and corresponds to 'name="nob05"' in the 90th line.

Further, this parameter designation information describes in the 92nd line that the control parameter as the adjustment object parameter is adjusted to one of "1," "2," "3" and "4" when the adjustment knob 43 is operated. Further, this parameter designation information designates "4" as an initial value of the control parameter in the 94th line.

It is to be noted that this control parameter is cited in the 262nd to 265th lines hereinafter described using an identifier of modifier_05.

Parameter Designation Information which Designates a Material

The 96th to 107th lines describe parameter designation information which designates the material indication information for the instruction of a material applied to a polygon defined in the CG description data as the adjustment object parameter.

More particularly, for example, the parameter designation information designates, in the 96th line, an adjustment knob 43 used when the material indication information designated as the adjustment object parameter is adjusted and corresponds to 'name="nob06"' in the 96th line.

Further, for example, the parameter designation information designates, in the 98th line, material indication information which indicates a material of a polygon of a parallelepiped, which is a polygon represented by "Box01" described in the CG description data in FIGS. 13 to 22, as the adjustment object parameter.

Further, the parameter designation information describes in the 101st to 104th lines that, when the adjustment knob 43 is operated, the material indication information as the adjustment object parameter is adjusted to the material indication information "0" which indicates a material corresponding to "id2_Material" or the material indication information "1" which indicates a material corresponding to "id1_material."

By an operation of the adjustment knob 43, the value of "0" or "1" is transmitted from the console 21 to the CG image production apparatus 22 through an intermediate communication path. If "0" is received, then the CG image production apparatus 22 allocates the material of the identifier "id2_Material" to a face of the surface of the "Box01" object which is designated as a target by "rel_target" so that the material is used for calculation of rendering, that is, for production of a CG image. On the other hand, if "1" is received, then the CG image production apparatus 22 allocates the material of the identifier "id1_Material" to the face of the surface of the "Box01" object which is designated as a target by "rel_target" so that the material is used for calculation of rendering, that is, for production of a CG image.

Designation Information which Designates a Texture

The 108th to 121st lines describe parameter designation information which designates texture indication information for indicating a texture to be mapped to the polygon defined in the CG description data as an adjustment parameter.

More particularly, for example, this parameter designation information designates, in the 108th line, an adjustment knob 43 used when the texture indication information designated as the adjustment object parameter is adjusted and corresponds to 'name="nob0"' in the 64th line.

Further, for example, the parameter designation information describes in the 115th and 116th lines that, when the adjustment knob 43 is operated, the texture indication information as the adjustment object parameter is adjusted to the texture indication information "0" which indicates a texture represented by "img6-image" or the texture indication "1" which indicates a texture represented by "img5-image."

Further, the parameter designation information describes in the 110th line that an object for indicating a texture is an "effect" to which an identifier "id2_Material-fx" is provided in the CG description data. By the describing method of the CG description data, this designation results in action upon the relevant material.

Parameter Designation Information which Designates a Hue

The 122nd to 142nd lines describe parameter designation information which designates a hue of the material of the polygon defined in the CG description data as an adjustment parameter.

More particularly, for example, this parameter designation information designates, in the 122nd line, an adjustment knob 43 which is used when the hue of the material designated as the adjustment object parameter is adjusted and corresponds to 'name="nob08"' in the 122nd line.

Further, for example, this parameter designation information describes in the 128th line that the hue of the material as the adjustment object parameter is adjusted by an operation of the adjustment knob 43. In the contents of the CG description data, the designation of a hue is carried out using an RGB system (Red, Green and Blue) (and an α value) and is usually written in RGB also in the working memory 87a or the working memory 181a. However, in the case where color adjustment is carried out using the adjustment knob 43 or the like, an operation is easier if the three parameters of Hue, Luminance and Saturation are used. Further, since mere designation of a place in the contents of the CG description data cannot cope with a case in which such parameter conversion is required, it is indicated in the 122nd line that the type of adjustment is the hue such that the CG image production apparatus 22 receives a value of the Hue and carries out conversion between the three parameters of Hue, Luminance and Saturation and the RGB values so that a result of the operation is reflected on the rendering.

Further, for example, the parameter designation information designates in the 138th and 139th lines that an operation mode of the adjustment knob 43 designated by the 122nd line is designated. In particular, in the 138th and 139th lines, an operation mode in which the adjustment object parameter is adjusted within the range from "0" to "1.0" linearly with respect to the angle of rotation of the adjustment knob 43, that is, in proportion to the angle of rotation of the adjustment knob 43, is designated.

It is to be noted that the parameter designation information can designate the luminance and the saturation as an adjustment parameter in addition to the hue.

Further, when a CG image is to be produced based on the CG description data from the load indication section 86, the image production sections 87 and 181 read out, refer to and convert, with regard to the hue, luminance and saturation designated as an adjustment parameter, RGB values of the relevant color from the stored contents of the working memory 87a or the working memory 181a and then convert the hue, luminance and saturation after adjustment back into corresponding RGB values in accordance with an instruction, whereafter they write the resulting RGB values into the working memory 87a or the working memory 181a so that they are used for rendering. This arises from the fact that the information when CG is rendered is represented by the RGB values.

First Data Link Designation Information which Designates Referring to External Data The 143rd to 159th lines describe first data link designation information which designates data to be used for production of a CG image and to be read out from the outside.

This data link designation information designates in the 144th line that data is read out from a file "http://www.w3.org/TR/xmlschema/file1.html" indicated by a URL (uniform resource locator) described in the 144th line. It is to be noted that the data read out from the external file is associated with and applied to an adjustment parameter represented by 'dest="modifier_01"' described in the 143rd line. In particular, while the data link designation information beginning with the 143rd line indicates control by an operation of the console 21 by the user, by this data link designation, the external data is referred to for updating.

Further, this data link designation information designates in the 148th and 149th lines that data of 4 bytes from the 28th byte data from the top of data which configure the file indicated by the URL in the 144th line should be read out.

Then, the data link designation information designates in the 150th line also that the read out data is handled as a binary integer.

Further, the data link designation information designates in the 157th line that data of 4 bytes from the 28th byte data from the top of the data which configure the file indicated by the URL in the 144th line is read out and referred to after each 15 seconds.

Second Data Link Designation Information which Designates Referring to External Data The 160th to 178th lines describe second data link designation information which designates data which is used for production of a CG image and is read out from the outside and referred to.

This data link designation information designates in the 165th line that data is read out from a file indicated by a URL in the 161st line. Further, the data link designation information designates in the 163rd line that the file is interpreted as xml data. Furthermore, the data link designation information designates that a portion designated by an element name "simpleOrder" and so forth described in the 165th and succeeding lines is read out. Further, the data link designation information designates in the 168th line that, from among a plurality of parameters arrayed in the designated portion, a parameter of the index 0, that is, a first parameter, is read out.

Third Data Link Designation Information which Designates Referring to External Data The 179th to 190th lines describe third data link designation information which designates data which are used for production of a CG image and are read out from the outside and referred to.

This data link designation information declares in the 182nd line that data of the csv format is referred to. Further, this data link designation information designates in the 184th to 186th lines that, from among a plurality of numerical values described in CSV data, a numerical value described in the third line of the fourth column is read out as a numerical value of the float type, that is, of the floating point type. Furthermore, the data link designation information designates in the 178th line that the data is associated with adjustment of "modifier_02."

Fourth Data Link Designation Information which Designates Referring to External Data The 191st to 201st lines describe fourth data link designation information which designates data which is used for production of a CG image and is read out from the outside and referred to.

This data link designation information declares in the 194th line that data of a format of a chain of tokens is referred to. Further, the data link designation information designates in the 196th and 197th lines that data corresponding to the ninth token from the top of data which configure the file is read out as data of the int type, that is, of the integer type. It is to be noted that a token represents data of a minimum unit having predetermined meanings and is extracted by dividing a text file by a predetermined grammar and delimited, for example, by a null character.

Parameter Designation Information which Designates a Three-Dimensional Position of the Virtual Camera The 203rd to 218th lines define CG description data. For example, parameter designation information which designates a position in a virtual space at which the virtual camera exists as an adjustment parameter is described. This data link designation information designates particularly in the 208th line that a three-dimensional position (x, y, z) in the virtual space at which the virtual camera exists is designated as the adjustment object parameter.

In particular, the data link designation information not designates a single scalar amount (for example, x) but describes that a three-dimensional position which is a vector value is handled collectively as one adjustment object, and this method is indicated by a keyword of "manipulator." This is a function which may be called vector parameter designation.

It is to be noted that, in the 204th line, the joystick 44 (corresponding to the numerical value 01 at the tail end of 'id="manipulator_01"' and 'name="xyz01"' in the 204th line) used for adjustment of the three dimensional position (x, y, z) of the virtual camera ("Camera01") designated as the adjustment object parameter is designated.

Accordingly, for example, if this parameter designation information is supplied from the load indication section 86 to the image production section 87 or the image production section 181, then the three-dimensional position (x, y, z) of the virtual camera can be adjusted by an operation of the joystick 44 of the console 21.

It is to be noted that, while operation means which can carry out a three-dimensional operation like this joystick 44 is utilized in this method, also it is possible to provide a plurality of such operation means such that they are utilized simultaneously. In the case where a plurality of such operation means are used, they can be identified with numerical values different from each other in place of the numeral value 01 given hereinabove.

Further, for example, this parameter designation information may designate that each of x, y and z includes a magnification for the multiplication to the value of an operation input as described in the 213th line.

Further, for example, the parameter designation information may designate as described in the 215th line that values obtained by adding offset values (in the example of the description of the 215th line, offset values (x, y, z)=(0, 0, 0)) to variation amounts of the three-dimensional position (x, y, z) which is varied by an adjustment operation of the user are handled as the three-dimensional position (x, y, z) as the adjustment object parameter after the variation by the adjustment operation of the user.

While the parameter designation information described in the 203rd to 218th lines designates the three-dimensional position (x, y, z) of the virtual camera as the adjustment object parameter, the parameter designation information may alternatively designate a three-dimensional position (x, y, z) of the virtual light or a polygon as the adjustment object parameter.

Furthermore, in addition to a three-dimensional position, magnification factors or rotational angles of x, y and z may be collectively handled as a vector value of an adjustment object. Further, if the present invention is applied, then it is easy to handle the values of the Hue, Luminance and Saturation of a color collectively as a vector value such that they can be operated by such three-dimensional operation as that of the joystick 44 or the like. The object vector value may not be a three-dimensional vector value, but, for example, two-dimensional UV values (not UVW values) may be operated by a joystick to carry out adjustment of UV coordinates when texture mapping is carried out.

Video Texture Mapping Designation Information

The 219th to 237th lines describe video texture mapping designation information which designates operation of receiving an image which can be used for texture mapping, for example, from the switcher 162 shown in FIG. 9 through the terminals T1 to T4 and texture mapping the received image to the polygon surface.

More particularly, for example, this video texture mapping designation information designates the terminal T1, which corresponds to 'vin="1"' described in the 220th line, in the 220th line. Further, the video texture mapping designation information designates in the 220th line that an object or target for which video texture mapping is carried out is made a material identified with "id1_Material." It is to be noted that, as the designation method of an object, a material may be designated with an identifier or a CG object such as, for example, Box01 which is an aggregate of polygons may be designated. In the latter case, it is described that the object is designated, for example, as a node in a CG space scene.

Further, for example, the video texture mapping designation information designates that UV coordinates of texture mapping are affine transformed using a matrix described in the 225th line and texture mapping is carried out based on new UV coordinates obtained by the affine transformation. It is to be noted that the UV coordinates represent coordinates used upon mapping of texture to the polygon surface.

Video Texture Mapping Designation Information to which a Condition for Executing Mapping is Added The 239th to 261st lines describe video texture mapping designation information to which condition indication information for indicating a condition in which video texture mapping is carried out to a material which is defined in the CG description data and satisfies a predetermined condition is added. It is to be noted that this video texture mapping designation information designates in the 220th line, for example, that an image ('vin="2" described in the 220th line) supplied through the terminal T2 from among the terminals T1 to T4 from among a plurality of images from the switcher 162 shown in FIG. 9 is used.

More particularly, the video texture mapping designation information designates as a condition 1 (cnd1) that a red component of an ambient color of a phong characteristic falls in a region from 0 to 0.776 (condition described in the 241st to 251st lines). Further, the video texture mapping designation information defines a condition 2 (cnd2) (whose contents are omitted) described in the 252nd to 254th lines and defines logical ANDing of the condition 1 and the condition 2 as a condition 3 described in the 255th to 257th lines. Further, the video texture mapping designation information describes in the 259th line that whether or not video texture mapping is carried out is decided depending upon the condition 3. In this instance, video texture mapping is applied to a surface which has an attribute which satisfies the conditions.

It is to be noted here that, while a value of a color is indicated as a numerical value used for the conditions, for example, a coordinate value, that is, a position in the virtual space, may be used in the conditions.

Further, the conditions are decided for each frame or for each field of a moving picture image. For example, in the case where a parameter of an object of the conditions varies together with the progress of the animation operation time depending upon a designation of an animation operation in the CG description data, only when a state in which the conditions are satisfied is established, video texture mapping is executed. As a result, also it is possible to control such that video texture mapping is carried out only within part of the progress of the animation.

Video Texture Mapping Designation Information which Uses a Control Parameter

The 262nd to 265th lines describe video texture mapping designation information with which selection of an image to be used for video texture mapping is controlled with a control parameter.

This video texture mapping designation information describes a designation regarding video texture mapping to a material designated by the identifier of "id2_Material."

Further, the video texture mapping designation information describes in the 262nd line that the control parameter as the adjustment object parameter indicates an input terminal of an image and an image from one of the terminals T1 to T4 which corresponds to the value at each point of time, which is a frame or a field which configures the moving picture image, of the control parameter described hereinabove with reference to the 90th to 95th lines is used for texture mapping.

It is to be noted that the control parameter is adjusted to one of "1" to "4," and the values "1" to "4" of the control parameter correspond to the terminals T1 to T4, respectively.

Consequently, the image to be used for texture mapping can be changed by the user operating the adjustment knob 43 or the like to change the control parameter. It is to be noted that, in the description of this portion, description of a detailed designation of video texture mapping and so forth is omitted.

Information which Designates Time Line Operation

The 267th to 270th lines describe information which represents a designation regarding a time line (time for reproduction of the CG animation) of the CG animation defined in the CG description data.

This information describes in the 268th line that an interval from "0" second to "1.0" second of the time line of the CG animation described in the CG description data is defined as an object of reproduction or progress.

It is to be noted that also it is possible, for example, to add a description of a designation value of the speed at which the time line is progressed, a designation (second) of the position at which the time line progress is started and so forth.

It is to be noted that, in the case where the parameter is adjusted in CG which includes an animation operation, if setting is carried out in accordance with a hope of the user, then it is possible to allow the parameter after the adjustment to be reflected on images at all timings produced by the CG animation.

In particular, for example, in the case where such adjustment that a certain parameter is increased by 30% while one point is referred to in a plurality of key frames which configure the CG animation is carried out, a corresponding parameter is increased by 30% similarly for all regions of the CG animation other than the key frame for which adjustment of the parameter is carried out. This can be implemented by carrying out a similar increasing change by 30% for data of all key frames.

Further, for example, also in the case where such adjustment that a certain parameter is increased by a predetermined value while one point is referred to in a plurality of key frames which configure the CG animation is carried out, it is possible to allow such adjustment which increases a corresponding parameter by a predetermined value with regard to all regions of the CG animation to be carried out similarly.

It is to be noted that such a configuration that, when the user uses the console 21 to carry out adjustment of a parameter while referring to a certain key frame, only when such a setting operation as to apply a change also to all regions of the CG animation, adjustment for all regions of the CG animation is carried out may be adopted. When setting by a setting operation which applies a change is not carried out, a change is applied only at the point of time at which adjustment is carried out, and if the animation is progressed thereafter, then the influence of the adjustment of the parameter may be eliminated.

Information which Designates Setting in Preview

The 271st to 277th line describe information which designates setting regarding a preview output.

This information designates in the 272nd line that, from among lookahead, pause and play which are kinds of the preview, the pause is made default, that is, still picture preview. It is to be noted that the play is a progressing preview, and the lookahead is a designation of preview outputting a still picture of the last key frame.

Further, this information designates in the 274th line that, if still picture preview is indicated, then a CG image outputted at time of one second of the produced CG animation is outputted as a preview output.

Further, this information designates in the 275th line that, if progressing preview is indicated, then the preview is carried out such that the CG animation is progressed at a progressing speed equal to 1.5 times an ordinary speed.

It is to be noted that also it is possible to include information other than that described hereinabove in the derivative information file, and, for example, a file which designates an initial value of the adjustment object parameter can be designated.

For example, by the description of
<behavior>
<initparam_file>1_default_snapshot.bin</init_param_file>
</behavior>
a file which retains a value of a parameter can be designated as a file for designating an initial value. Here, "1_default_snapshot.bin" indicates a file in which values of parameters determined as adjustment object parameters in the derivative information file are retained. The values of parameters retained in the file can be used not only as initial values, but also it is possible to set the parameters to the values by recalling them during utilization. Here, it is designated that, when the derivative information file and the CG description data are loaded, the values of the file described above are used as the values of the parameters to be applied immediately. It is to be noted that the file which retains the values of the parameters corresponds to the parameter value indication information and provides one of carrying out methods thereof.

<3. Modifications>

In the first and second embodiments described above, in order to specify CG description data including an adjustment object parameter designated by parameter designation information, a derivative information file includes an identifier of the CG description data including an adjustment object parameter or the like designated by the parameter designation information in the derivative information file. However, the specification method of CG description data corresponding to a derivative information file is not limited to this.

In particular, the CG image production apparatus 22, CG image production apparatus 161 or the like may newly retain link information which associates a derivative information file and CG description data including an adjustment object file designated by the derivative information file with each other such that the CG description data corresponding to the derivative information file is specified based on the link information.

It is to be noted that the link information may be, for example, a table which associates a derivative information file and corresponding CG description data with each other. Or, for example, in the case where a derivative information file and corresponding CG description data are included in the same directory or folder, the directory in which the derivative information file and the CG description data are included can be adopted as link information which represents that the derivative information and the CG description data are associated with each other. In this instance, although only one CG description data can be placed in one directory, a plurality of derivative information files can be placed in one directory.

Or, for example, if such a directory structure that, in a lower layer of a directory in which CG description data is included, a derivative information file associated with the CG description data is stored is configured and stored, then the directory structure can be used as the link information.

It is to be noted that, as regards a file which retains a value of a parameter, it is possible to adopt such a configuration that, since it corresponds to an individual derivative information file, a directory is further provided for each derivative information file and a plurality of files each of which retains a value of a parameter are placed in the directory.

In the case where a derivative information file does not include an identifier or link information for designating corresponding CG description data, the user would select corresponding CG description data together with the derivative information file.

The first embodiment described hereinabove may be modified such that the image production section 81 retains, in the built-in working memory 81*a*, a plurality of values as values of an adjustment object parameter adjusted formerly by an adjustment operation of a user and, if the user indicates one of the plural values adjusted formerly by an adjustment operation of the user, adjustment for returning the adjustment object parameter to the value of the adjustment object parameter designated by the user is carried out. This can also be said to the image production section 181 in the second embodiment. This operation can be carried out by designating different parameters one by one or collectively at a time. Or else, in response to an instruction from the console 21, the contents of a file which retains values of parameters are read in to change the values of all parameters of an adjustment object.

Further, it is possible to update parameter value indication information of the image production section 81 or the image production section 181 in response to an updating operation carried out by a user to update the parameter value indication information using the console 21.

In particular, if an updating operation of a user is carried out in the image production section 81 or the image production section 181, the load instruction section 86 reads out parameter value indication information of the updating object from the derivative information storage section 85 under the control of the image production section 81 which receives an operation signal corresponding to the updating operation of the user. Then, the load instruction section 86 updates the read out parameter value information of the updating object and supplies the updated parameter value indication information to the derivative information storage section 85 so as to be stored by overwriting.

Consequently, the value of the parameter value indication information of the updating object can be updated.

Further, while, in the first embodiment, for example, the console 21 and the CG image production apparatus 22 are configured separately from each other, the console 21 may be provided in the CG image production apparatus 22. This similarly applies also the CG image production apparatus 161 in the second embodiment.

While the present invention is applied to a computer graphics image in a virtual three-dimensional space calculated in such a manner as to be picked up by a virtual camera, it can be applied also to a stereo image which implements false stereoscopic vision from a pair of images corresponding to the left and right eyes. In the case where a stereo image by computer graphics is produced, left and right images may be produced by a pair of virtual cameras corresponding to the left and right eyes. Also in this instance, the present invention can be applied directly.

While the series of processes described above can be executed by dedicated hardware, it may otherwise be executed by software. Where the series of processes is executed by software, a program which constructs the software is installed from a program recording medium into a computer incorporated in hardware or, for example, a personal computer for universal use which can execute various functions by installing various programs.

Example of the Configuration of the Computer

Figure 29:
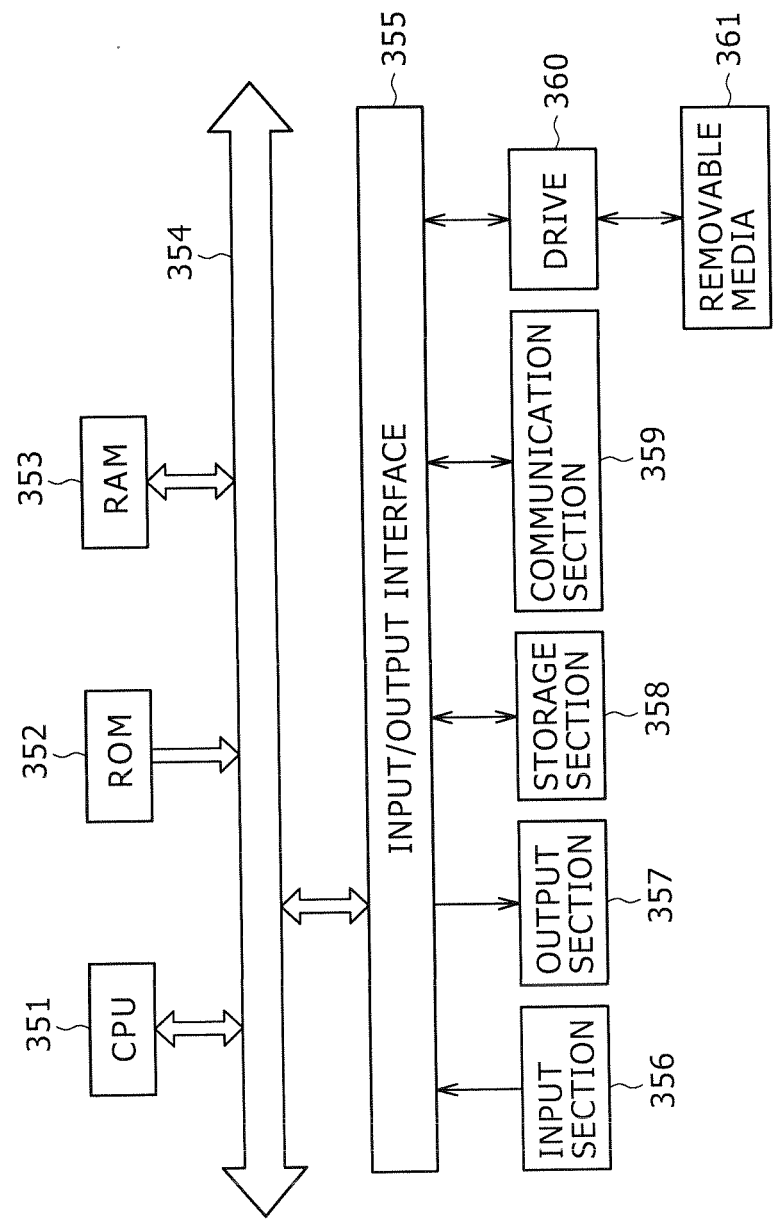
FIG. 29 is a block diagram showing an example of a configuration of a computer.

FIG. 29 shows an example of a configuration of a personal computer which executes the series of processes described hereinabove in accordance with a program.

Referring to FIG. 29, a central processing unit (CPU) 351 executes various processes in accordance with a program stored in a read only memory (ROM) 352 or a storage section 358. A program to be executed by the CPU 351, data and so forth are suitably stored into a random access memory (RAM) 353. The CPU 351, ROM 352 and RAM 353 are connected to one another by a bus 354.

Also an input/output interface 355 is connected to the CPU 351 through the bus 354. An input section 356 including a keyboard, a mouse, a microphone and so forth and an output section 357 including a display unit, a speaker and so forth are connected to the input/output interface 355. The CPU 351 executes various processes in accordance with an instruction inputted from the input section 356. Then, the CPU 351 outputs a result of the processes to the output section 357.

The storage section 358 connected to the input/output interface 355 is formed, for example, from a hard disk and stores a program to be executed by the CPU 351 and various data. A communication section 359 communicates with an external apparatus connected thereto through a network such as the Internet and/or a local area network.

A program may be acquired through the communication section 359 and stored into the storage section 358.

A drive 360 is connected to the input/output interface 355. When a removable medium 361 such as a magnetic disk, an optical disk, a magneto-optical disk, a semiconductor memory or the like is loaded into the drive 360, the drive 360 drives the removable medium 361. Thereupon, the drive 360 acquires a program, data and so forth recorded on the removable medium 361. The acquired program or data are transferred to and stored into the storage section 358 as occasion demands.

The program recording medium on which a program to be installed into a computer and placed into an executable condition by the computer is recorded may be, for example, as shown in FIG. 29, a removable medium 361 in the form of a package medium formed from a magnetic disk (including a flexible disk), an optical disk (including a CD-ROM (Compact Disk-Read Only Memory) and a DVD (Digital Versatile Disk)), a magneto-optical disk (including an MD (mini-disc)), or a semiconductor memory. Or, the program recording medium may be formed as the ROM 352, a hard disk included in the storage section 358 or the like in which the program is recorded temporarily or permanently. Recording of the program into or on the program recording medium is carried out, as occasion demands, through the communication section 359 which is an interface such as a router and a modem, making use of a wired or wireless communication medium such as a local area network, the Internet or a digital satellite broadcast.

It is to be noted that, in the present specification, the steps which describe the program recorded in or on a program recording medium may be but need not necessarily be processed in a time series in the order as described, and include processes which are executed in parallel or individually without being processed in a time series.

Further, in the present specification, the term "system" is used to represent an entire apparatus composed of a plurality of devices or apparatus.

Further, embodiments of the present invention are not limited to the first and second embodiments described hereinabove, but variable alterations and modifications can be made without departing from the spirit and scope of the present invention.

In related art, in the case where CG is partly changed and used for broadcasting or the like, the CG is worked or edited by application software for CG production and then rendered to produce image data to be utilized. However, according to the present invention, it is possible to operate and change a parameter designated by parameter designation information using operation means which can be used readily and then immediately obtain an image on which such operation or change is reflected without spending such effort.

Although the operation means is the rotational knobs (adjustment knobs 43), joystick 44 and so forth which are easy to use, the number of such operation means which can be disposed on the console 21 or the like is limited. According to the present invention, since the limited number of operation means can be used to change a CG parameter to be associated for each utilization object, the operation means can be used for various adjustments while maintaining the operability.

Even if the same CG material or CG description data is operated by the same operation means, different operation results conforming to various objects can be obtained, and utilization suitable for various utilizations can be anticipated.

A plurality of CG description data which are different CG works can be retained. A plurality of derivative information files can be provided for each of such CG description data. Since each derivative information file is associated with only one CG description data, if one of the derivative information files is designated and loaded, then the CG description data can be loaded without an error. Besides, the operation means can be operated in accordance with the derivative information file to allow a function for controlling a desired parameter to operate. Further, video texture mapping can be applied to a desired face.

Since CG description data and a derivative information file are separated from each other, by increasing derivative information files which are small in size and easy to handle, various images can be produced from one CG description data and various operations can be made.

Each derivative information file can be retained into the apparatus according to an embodiment of the present invention such that it is associated with a file which retains values of a plurality of parameters. Further, such a configuration may be adopted that retaining of a parameter value is implemented by writing the parameter value into the derivative information file itself.

Also it is possible to associate animation time with parameter designation information such that CG produced using the animation time as an operation object is controlled. In this instance, a real value, actually a floating point value, is used as the parameter. Further, in the case where one CG description data includes a plurality of time line animations, it is possible to designate such that some of the time lines is selected to use the animation time as an object of control. For example, it is possible to adopt a configuration that, in an animation work wherein a plurality of objects move, an operation for causing only some object to move can be carried out.

Although it is possible to provide a function of returning a parameter of an operation object to its initial value, since CG description data including an animation always holds current time at which an image is being produced, a value of the contents of CG corresponding to the current time can be used as the initial value. In other words, it is possible to provide a function of initializing the animation not to the first state but to the state corresponding to the current time.

The CG production application software can operate all parameters included in a CG work. On the other hand, in the control which uses parameter designation information according to an embodiment of the present invention, what can be operated is only some of parameters set in a derivative information file. By restricting those parameters which can be controlled in this manner, in a real-time system wherein communication controlled for each frame or for each field like a switcher which is used in broadcasting is carried out, parameters of CG can be operated while the real-time property of the system, that is, the synchronism with an image frame, is maintained.

Further, the CG production application software requires, also where a graphical user interface is used, much complicated operations, and even in the case where a little change is to be applied, it is necessary to select an operation from among a large number of menu displays. In the present invention, since it is made possible to operate parameters associated with a limited number of operation means which are accustomed to use, such complicatedness as in such a case that application software for a personal computer is operated is eliminated but only a small number of operation means are operated. Accordingly, also for live broadcasting, reliable operation means which are less likely to be operated in error can be provided. Further, a knob or rotational dial or a push-button switch which are comparatively expensive and superior in durability can be used.

Since a method wherein a derivative information file is designated to load CG is provided, it becomes possible to use a CG material derived from one basic CG description data with an operation feeling similar to that when one file is selectively used from among a large number of video materials stored in a video clip server in related art. Accordingly, a CG material of a different type can be used without any confusion upon utilization.

If the present invention is compared with a technique wherein CG description data is selected and loaded simply to produce a CG image, then the present invention has the following characteristic. In particular, a derivative information file itself applies modification to basic CG description data and it becomes possible to select only a derivative information file to produce a CG image. Therefore, as viewed from the user, the derivative information file can be handled as if it were new derivative CG, and therefore, it can be handled readily.

CG description data in a sense prescribes a procedure in which a computer carries out a rendering process of an image, and can be regarded as a kind of program. Describing the present invention from this point of view, the present invention applies a relationship between a basic class and a derivative class of object-oriented programming in programming to CG to construct the relationship as a relationship between basic CG description data and a derivative information file.

Accordingly, while, in programming, various expansions can be made by production of a derivative class, a derivative information file in an embodiment of the present invention can include all descriptions for modifying, working and expanding basic CG description data similarly.

This can be applied to various applications in accordance with applications such as, for example, to annex an audio output to particular time or a particular state of an animation, to make operation of some other apparatus interlink, or to work the time line.

According to the present invention, a system for CG image production which is used for utilization of broadcasting or the like can be constructed without including CG production application software. In particular, production of a CG work is carried out by each CD producer or artist using a personal computer. Then, only produced CG description data and related files, that is, a texture file of a still picture and/or a shader, are delivered. Then, in the broadcasting station which receives them, they are stored into the CG synthesis system 1 or the like and can be used for utilization, that is, for broadcasting through addition of modification information such as a manner of operation of CG for producing and utilizing a derivative information file.

The CG production application software has high functions, and therefore, it sometimes has a bad influence upon a computer during use thereof. Thus, it is not suitable to cause the CG production application software to operate on a system for use for broadcasting utilization. According to the present invention, a CG work can be used for stabilized broadcasting utilization while leaving the advantage of partial change of a derivative information file without the necessity for causing such software as described above to operate.

The present application contains subject matter related to that disclosed in Japanese Priority Patent Application JP 2010-089028 filed in the Japan Patent Office on Apr. 7, 2010, the entire content of which is hereby incorporated by reference.

While preferred embodiments of the present invention have been described using specific terms, such description is for illustrative purpose only, and it is to be understood that changes and variations may be made without departing from the spirit or scope of the following claims.

What is claimed is:
1. An image processing apparatus, comprising:
working storage means in which computer graphics description data is stored for use in producing an image, the computer graphics description data being stored in a storage format in which a computer graphics material can be edited;
updating controlling means for controlling a writing operation into part of said working storage means, the writing operation being controlled in accordance with derivative information representative of information which describes control for the contents stored in said working storage means, the derivative information including:
parameter designation information which designates one or more of a plurality of parameters included in the computer graphics description data as an adjustment object parameter, and
parameter value indication information which indicates that one of the plural parameters is to be adjusted to a predetermined value,
said updating controlling means controlling the writing operation into the part of said working storage means in accordance with the parameter designation information so that the corresponding parameter may have the predetermined value and so that the adjustment object parameter may have a value corresponding to an adjustment operation of a user; and
image production means for producing a computer graphics image based on the stored contents of said working storage means.
2. The image processing apparatus according to claim 1, further comprising a plurality of parameter operation means for being operated by the user;

the parameter designation information designating also that one of said plural parameter operation means which is provided to adjust the adjustment object parameter;

said updating controlling means controlling the writing operation into the part of said working storage means so that, when the adjustment operation of the user is carried out for the parameter operation means designated by the parameter designation information, the adjustment object parameter may have a value according to the adjustment operation of the user.

3. The image processing apparatus according to claim 1, wherein said updating controlling means controls the writing operation into the part of said working storage means so that the adjustment object parameter may have a value indicated by the indication operation of the user from among a plurality of retained values adjusted formerly by adjustment operation of the user.

4. The image processing apparatus according to claim 1, wherein said updating controlling means controls the writing operation into the part of said working storage means so that the adjustment object parameter may be the adjustment object parameter included in the computer graphics description data prior to the adjustment in response to an initialization operation of the user.

5. The image processing apparatus according to claim 1, further comprising:

derivative information retaining means for retaining the derivative information; and updating means for updating the parameter value indication information included in the derivative information in response to an updating operation of the user;

said derivative information retaining means retaining the derivative information including the parameter value indication information after updated.

6. The image processing apparatus according to claim 5, further comprising:

computer graphics data retaining means for retaining one or a plurality of computer graphics description data in advance therein;

readout means for reading out the computer graphics description data corresponding to the derivative information read out from said derivative information retaining means from among the one or plural computer graphics description data; and setting means for setting, from among the plural parameters included in the computer graphics description data read out from said computer graphics description data retaining means, the parameter designated by the parameter designation information included in the derivative information read out from said derivative information retaining means as the adjustment object parameter.

7. The image processing apparatus according to claim 6, wherein the derivative information includes identification information for identifying the corresponding computer graphics description data, and said readout means reads out the computer graphics description data identified with the identification information included in the derivative information read out from said derivative information retaining means.

8. The image processing apparatus according to claim 6, further comprising:

link information retaining means for retaining link information which associates the derivative information and the corresponding computer graphics description data with each other in advance therein;

said readout means reading out the computer graphics description data corresponding to the derivative information read out from said derivative information retaining means based on the link information.

9. The image processing apparatus according to claim 6, wherein said readout means reads out the computer graphics description data selected by a selection operation of the user as the computer graphics description data corresponding to the derivative information read out from said derivative information retaining means.

10. An image processing method for an image processing apparatus for producing a computer graphics image, the image processing apparatus including working storage means in which computer graphics description data is stored for use in producing an image, the computer graphics description data being stored in a storage format in which a computer graphics material can be edited, updating controlling means and image production means, the image processing method comprising:

a step executed by the updating controlling means of controlling a writing operation into part of the working storage means, the writing operation being controlled in accordance with derivative information representative of information which describes control for the contents stored in the working storage means, the derivative information including:

parameter designation information which designates one or more of a plurality of parameters included in the computer graphics description data as an adjustment object parameter, and parameter value indication information which indicates that one of the plural parameters is to be adjusted to a predetermined value, and the writing operation being controlled in accordance with the parameter designation information so that the corresponding parameter may have the predetermined value and so that the adjustment object parameter may have a value corresponding to an adjustment operation of a user; and a step executed by the image production means of producing a computer graphics image based on the stored contents of the working storage means.

11. A program encoded in a non-transitory computer-readable storage medium for causing a computer to function as:

updating controlling means for controlling a writing operation into part of working storage means in which computer graphics description data is stored for use in producing an image, the computer graphics description data being stored in a storage format in which a computer graphics material can be edited, the writing operation being controlled in accordance with derivative information representative of information which describes control for the contents stored in the working storage means, the derivative information including:

parameter designation information which designates one or more of a plurality of parameters included in the computer graphics description data as an adjustment object parameter, and parameter value indication information which indicates that one of the plural parameters is to be adjusted to a predetermined value., and the writing operation being controlled in accordance with the parameter designation information so that the corresponding parameter may have the predetermined value and so that the adjustment object parameter may have a value corresponding to an adjustment operation of a user; and image production means for producing a computer graphics image based on the stored contents of the working storage means.

12. An image processing apparatus, comprising:
a working storage section in which computer graphics description data is stored for use in producing an image, the computer graphics description data being stored in a storage format in which a computer graphics material can be edited;
an updating controlling section adapted to control a writing operation into part of said working storage section, the writing operation being controlled in accordance with derivative information representative of information which describes control for the contents stored in said working storage section, the derivative information including:
   parameter designation information which designates one or more of a plurality of parameters included in the computer graphics description data as an adjustment object parameter, and
   parameter value indication information which indicates that one of the plural parameters is to be adjusted to predetermined value
said updating controlling means controlling the writing operation into the part of said working storage means in accordance with the parameter designation information so that the corresponding parameter may have the predetermined value and so that the adjustment object parameter may have a value corresponding to an adjustment operation of a user; and
an image production section adapted to produce a computer graphics image based on the stored contents of said working storage section.

* * * * *